(12) United States Patent
Sato

(10) Patent No.: US 12,136,997 B2
(45) Date of Patent: Nov. 5, 2024

(54) POLARIZATION-FLUCTUATION ESTIMATING DEVICE AND POLARIZATION-FLUCTUATION ESTIMATING METHOD

(71) Applicant: NEC Corporation, Tokyo (JP)

(72) Inventor: Masaki Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 102 days.

(21) Appl. No.: 17/914,442

(22) PCT Filed: Mar. 4, 2021

(86) PCT No.: PCT/JP2021/008398
§ 371 (c)(1),
(2) Date: Sep. 26, 2022

(87) PCT Pub. No.: WO2021/205786
PCT Pub. Date: Oct. 14, 2021

(65) Prior Publication Data
US 2023/0119766 A1 Apr. 20, 2023

(30) Foreign Application Priority Data
Apr. 7, 2020 (JP) .................. 2020-069132

(51) Int. Cl.
*H04J 14/06* (2006.01)
*G01J 4/04* (2006.01)
(Continued)

(52) U.S. Cl.
CPC .............. *H04J 14/06* (2013.01); *G01J 4/04* (2013.01); *H04B 10/2507* (2013.01); *H04B 10/0795* (2013.01); *H04B 10/614* (2013.01)

(58) Field of Classification Search
None
See application file for complete search history.

(56) References Cited

U.S. PATENT DOCUMENTS 6,512,627 B1 * 1/2003 Kim .................. G02B 6/29397
359/332
8,731,411 B2 * 5/2014 Oda .................. H04B 10/6163
398/208
(Continued)

FOREIGN PATENT DOCUMENTS

JP 2000-048269 A 2/2000
JP 2009-218646 A 9/2009
(Continued)

OTHER PUBLICATIONS

International Search Report for PCT Application No. PCT/JP2021/008398, mailed on May 11, 2021.
(Continued)

*Primary Examiner* — Jai M Lee
(74) *Attorney, Agent, or Firm* — Sughrue Mion, PLLC

(57) ABSTRACT

In order to estimate a polarization fluctuation speed with high accuracy independently of the quality of a received signal, a polarization-fluctuation estimating device according to the present invention includes: a polarization de-multiplexing unit that generates a single-polarization optical signal from an input polarization-multiplexed optical signal; a photoelectric converting unit that converts the generated optical signal into an electrical signal; and an estimation unit that estimates the polarization fluctuation speed of the polarization-multiplexed optical signal in accordance with the electrical signal.

18 Claims, 20 Drawing Sheets

(51) Int. Cl.
  *H04B 10/2507* (2013.01)
  *H04B 10/079* (2013.01)
  *H04B 10/61* (2013.01)

(56) References Cited

U.S. PATENT DOCUMENTS

| | | | |
|---|---|---|---|
| 9,100,126 B2* | 8/2015 | Abe | H04B 10/532 |
| 9,537,570 B2* | 1/2017 | Mizuguchi | H04B 10/5053 |
| 10,122,468 B2* | 11/2018 | Yoshida | H04B 10/5161 |
| 10,859,408 B2* | 12/2020 | Suzaki | G01D 5/35383 |
| 11,050,484 B2* | 6/2021 | Oda | H04B 10/0795 |
| 2003/0112436 A1* | 6/2003 | Yao | G02B 6/2786 |
| | | | 356/364 |
| 2022/0303012 A1* | 9/2022 | Takamuku | H04B 10/614 |

FOREIGN PATENT DOCUMENTS

| | | | |
|---|---|---|---|
| JP | 2016-152556 A | | 8/2016 |
| JP | 2018174413 A | * | 11/2018 |
| JP | 2019-071679 A | | 5/2019 |
| WO | 2010/026894 A1 | | 3/2010 |
| WO | 2020/255809 A1 | | 12/2020 |

OTHER PUBLICATIONS

English translation of Written opinion for PCT Application No. PCT/JP2021/008398, mailed on May 11, 2021.
JP Office Communication for JP Application No. 2022-514338, mailed on Oct. 31, 2023 with English Translation.

* cited by examiner

POLARIZATION-FLUCTUATION ESTIMATING DEVICE AND POLARIZATION-FLUCTUATION ESTIMATING METHOD

This application is a National Stage Entry of PCT/JP2021/008398 filed on Mar. 4, 2021, which claims priority from Japanese Patent Application 2020-069132 filed on Apr. 7, 2020, the contents of all of which are incorporated herein by reference, in their entirety.

TECHNICAL FIELD

The present invention relates to a polarization fluctuation estimation device and a polarization fluctuation estimation method and particularly relates to a device, a method, and a program for estimating the fluctuation speed of polarization in an optical transmission system.

BACKGROUND ART

A polarization multiplexing digital coherent method is used in a high-capacity trunk optical transmission system with a transmission rate exceeding 100 gigabit per second (Gbps) in recent years. In the polarization multiplexing digital coherent method, an optical transmitter generates a polarization-multiplexed optical signal by polarization-multiplexing two optical signals modulated by quadrature phase shift keying (QPSK), quadrature amplitude modulation (QAM), or the like. In an optical receiver, by detecting a received polarization-multiplexed optical signal by a coherent receiver, the polarization-multiplexed optical signal is converted into an analog signal being an electric signal. An analog-to-digital converter (hereinafter referred to as "ADC") positioned in the subsequent stage of the coherent receiver converts the analog signal into a digital signal. The received signal converted into the digital signal is demodulated by digital signal processing.

A polarization multiplexing digital coherent type optical receiver separates a polarization-multiplexed optical signal into polarized signals by a combination of a coherent receiver and digital signal processing. Fluctuation in a polarization state given to a polarization-multiplexed optical signal by an optical transmission channel significantly affects polarization de-multiplexing performance by the digital signal processing. Accordingly, it is preferable to be able to accurately estimate the polarization fluctuation speed of a polarization-multiplexed optical signal propagating through a transmission channel in terms of performance security and failure detection in an optical transmission system.

In relation to the present invention, PTL 1 describes power monitoring of an optical signal in a coherent-type optical receiver. Further, PTL 2 describes estimation of the polarization state of a polarization-multiplexed optical signal.

CITATION LIST

Patent Literature

PTL 1: Japanese Unexamined Patent Application Publication No. 2019-071679
PTL 2: Japanese Unexamined Patent Application Publication No.

SUMMARY OF INVENTION

Technical Problem

In a common polarization multiplexing digital coherent method, optical polarization de-multiplexing of a polarization-multiplexed optical signal is performed by a polarization beam splitter (hereinafter referred to as "PBS"), and minute polarization de-multiplexing is subsequently performed by digital signal processing. PTL 2 describes a procedure for common digital signal processing performing minute polarization de-multiplexing by using an adaptive equalizer using a finite impulse response (hereinafter referred to as "FIR") filter. Specifically, PTL 2 proposes a technique of estimating the polarization state of a polarization-multiplexed optical signal from a filter factor of an adaptive equalizer. However, the procedure described in PTL 2 has the following issues.

A first issue is that when a received signal cannot be demodulated due to low quality of a received signal, the procedure described in PTL 2 cannot calculate polarization fluctuation speed. The reason is that the procedure described in PTL 2 assumes that a received signal can be demodulated by an adaptive equalizer. Further, the procedure described in PTL 2 also cannot demodulate a received signal when the modulation method or a the symbol rate of the received signal is unknown and therefore cannot calculate polarization fluctuation speed in such a case.

A second issue is that performance of the procedure described in PTL 2 depends on polarization tracking performance of the adaptive equalizer. For example, when the polarization fluctuation speed of an optical signal exceeds speed allowing demodulation using the adaptive equalizer, the procedure described in PTL 2 cannot suitably set tap coefficients of the FIR filter. In such a case, the procedure in PTL 2 is not applicable, and therefore the polarization fluctuation speed cannot be estimated.

Thus, the measurement procedure of polarization fluctuation speed described in PTL 2 has an issue that it is difficult to constantly estimate polarization fluctuation speed with a high degree of precision due to an effect of quality of a received signal and restricted ability of the adaptive equalizer to track polarization fluctuation. Further, PTL 1 does not disclose a means for solving such an issue.

OBJECT OF INVENTION

An object of the present invention is to provide a technology for estimating polarization fluctuation speed with a high degree of precision without depending on quality of a received signal.

Solution to Problem

A polarization fluctuation estimation device according to the present invention includes: a polarization de-multiplexing means for generating a single-polarization optical signal from an input polarization-multiplexed optical signal; a photoelectric conversion means for converting the generated optical signal into an electric signal; and an estimation means for performing estimation of polarization fluctuation speed of the polarization-multiplexed optical signal, based on the electric signal.

A polarization fluctuation estimation method according to the present invention includes a procedure for: generating a single-polarization optical signal from an input polarization-multiplexed optical signal; converting the generated optical signal into an electric signal; and performing estimation of polarization fluctuation speed of the polarization-multiplexed optical signal, based on the electric signal.

A program for a polarization fluctuation estimation device according to the present invention causes a procedure for performing estimation of polarization fluctuation speed of an input polarization-multiplexed optical signal to be executed based on an electric signal converted from a single-polarization optical signal generated from the polarization-multiplexed optical signal.

Advantageous Effects of Invention

A polarization fluctuation estimation device, a polarization fluctuation estimation method, and a program for the polarization fluctuation estimation device, according to the present invention, enables high-precision estimation of polarization fluctuation speed without depending on quality of a received signal.

EXAMPLE EMBODIMENT

Example embodiments of the present invention will be described below with reference to drawings. An arrow illustrated in a diagram is an example of a signal direction or a processing order and is not intended to limit the direction or the order. A previously described component in an example embodiment or a drawing is given the same reference sign, and duplicated description thereof is omitted.

First Example Embodiment

Figure 1:
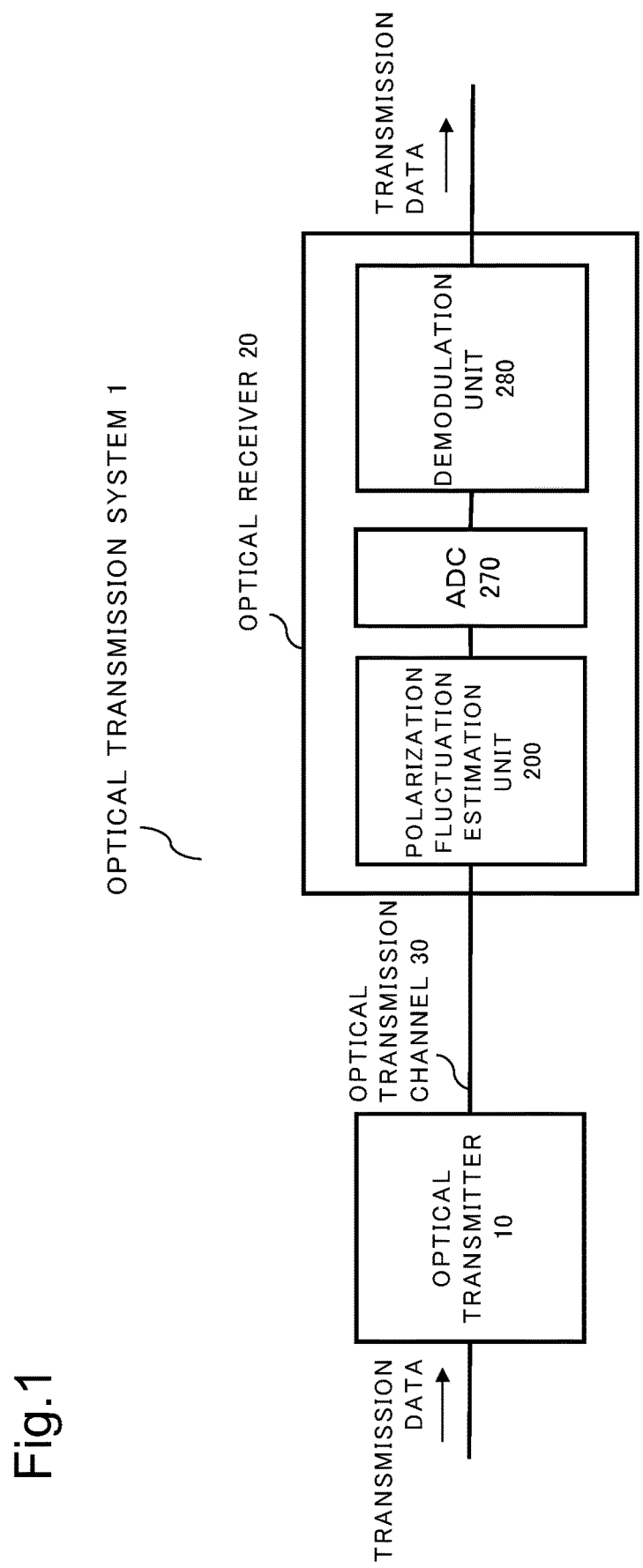
FIG. 1 is a block diagram illustrating a configuration example of an optical transmission system 1.

FIG. 1 is a block diagram illustrating a configuration example of an optical transmission system 1 according to the present invention. The optical transmission system 1 includes an optical transmitter 10, an optical receiver 20, and an optical transmission channel 30. The optical transmitter 10 converts input transmission data into an inphase (hereinafter referred to as "I") component and a quadrature (hereinafter referred to as "Q") component of each of an X-polarization wave and a Y-polarization wave and drives an optical modulator by using the electric signals XI, XQ, YI, and YQ. Furthermore, the optical transmitter 10 generates a polarization-multiplexed optical signal by polarization-combining modulated optical signals. The modulation method is phase modulation or intensity modulation on an optical carrier wave. The generated polarization-multiplexed optical signal is sent out to the optical transmission channel 30.

The optical transmission channel 30 is an optical fiber, and the optical receiver 20 receives a polarization-multiplexed optical signal propagating through the optical transmission channel 30. The optical receiver 20 includes a polarization fluctuation estimation unit 200, an analog-to-digital converter (ADC) 270, and a demodulation unit 280. The ADC 270 may be included in the polarization fluctuation estimation unit 200.

Figure 2:
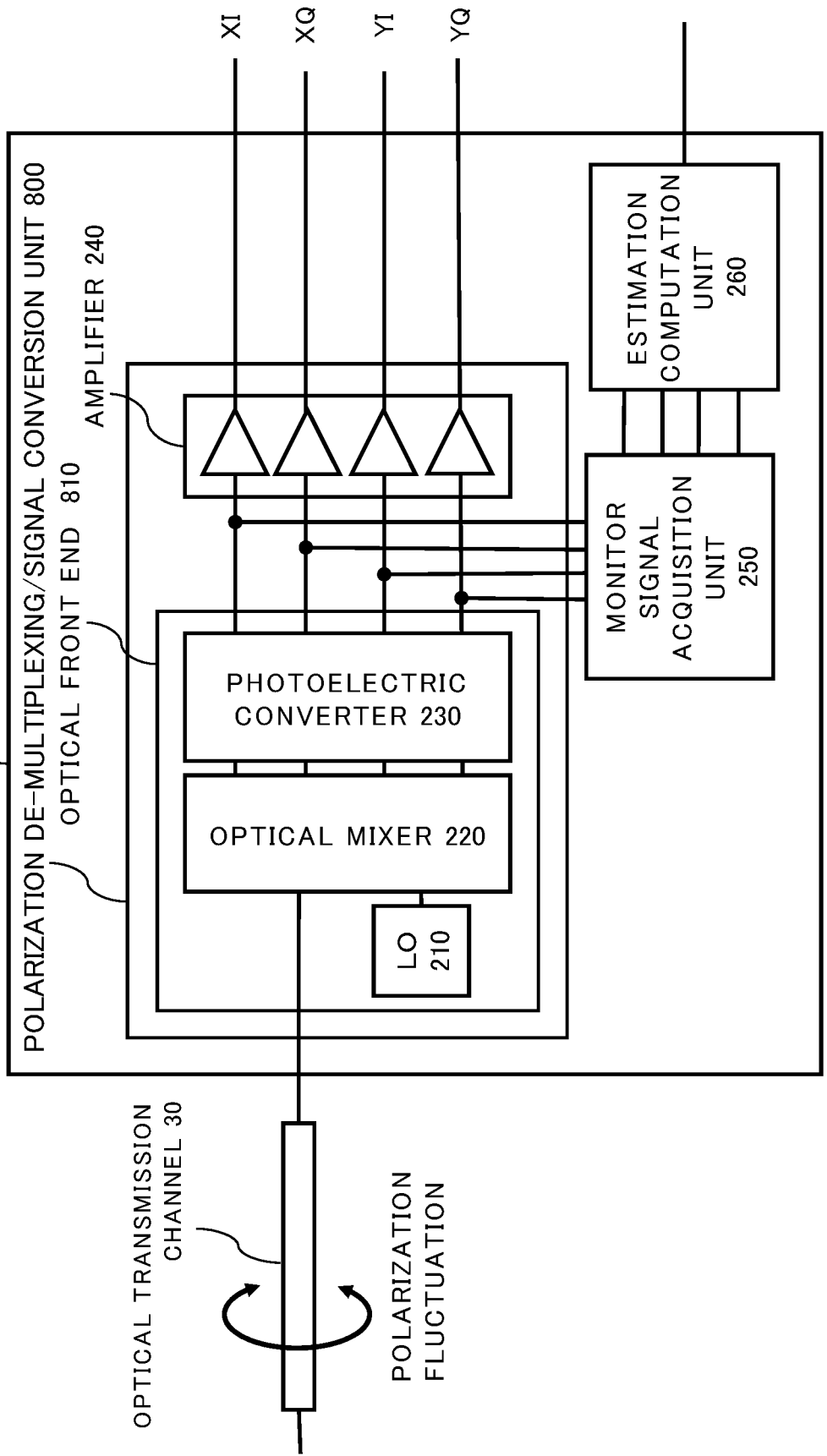
FIG. 2 is a block diagram illustrating a configuration example of a polarization fluctuation estimation unit 200.

FIG. 2 is a block diagram illustrating a configuration example of the polarization fluctuation estimation unit 200. The polarization fluctuation estimation unit 200 includes a polarization de-multiplexing/signal conversion unit 800, a monitor signal acquisition unit 250, and an estimation computation unit 260. The polarization de-multiplexing/signal conversion unit 800 includes an optical front end 810 and an amplifier 240. The optical front end 810 coherent-detects a polarization-multiplexed optical signal received from the optical transmission channel 30 and converts the detected signal into an electric signal. The amplifier 240 amplifies and outputs the electric signal generated by the optical front end 810.

The optical front end 810 includes a local oscillator (hereinafter referred to as "LO") 210, an optical mixer 220, and a photoelectric converter 230. For example, the LO 210 is a semiconductor laser and generates local oscillation light (hereinafter referred to as "LO light") being light with a wavelength identical or close to that of the received optical signal.

Figure 3:
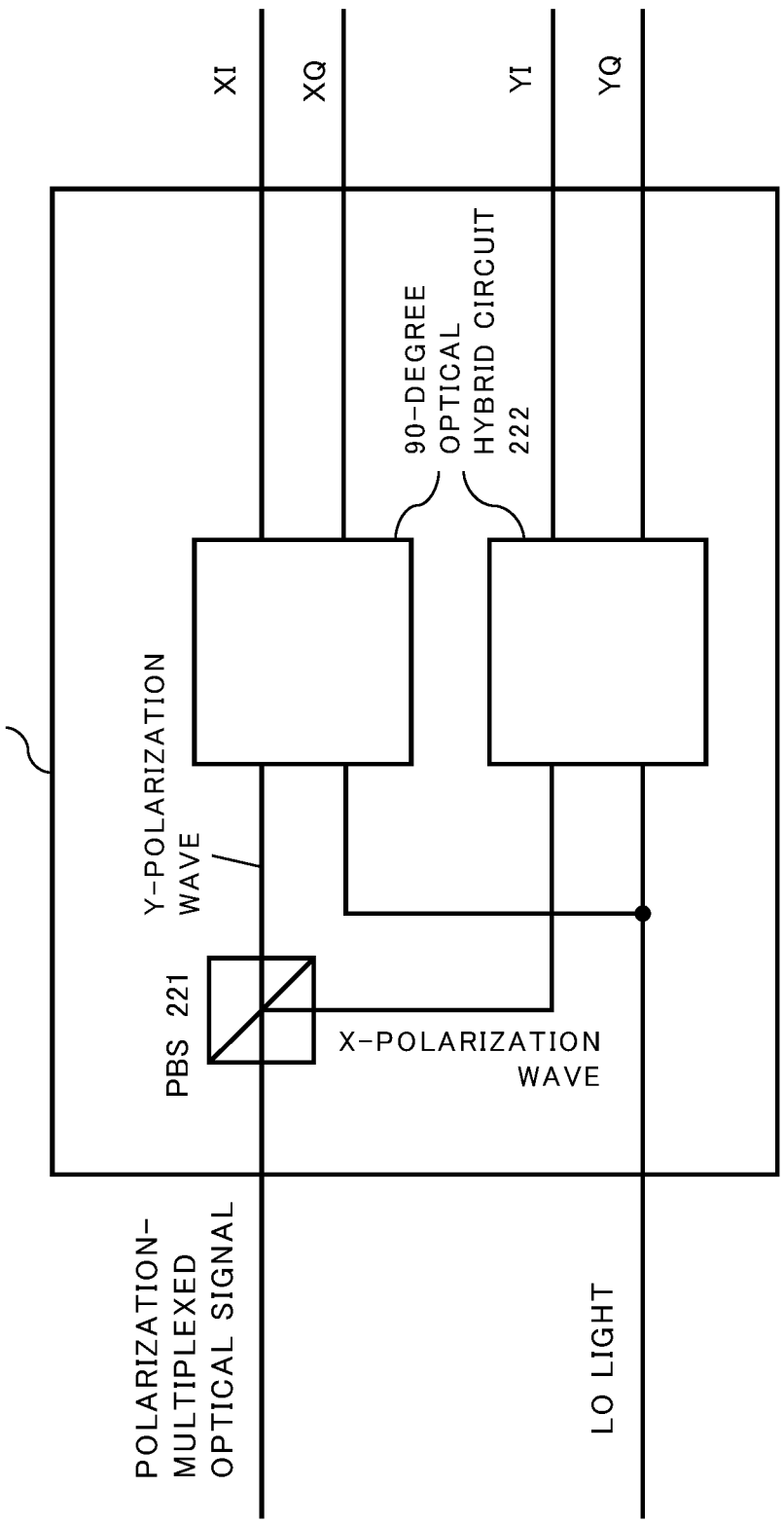
FIG. 3 is a block diagram illustrating a configuration example of an optical mixer 220.

FIG. 3 is a block diagram illustrating a configuration example of the optical mixer 220. The optical mixer 220 includes a PBS 221 and a 90-degree optical hybrid circuit 222. The PBS 221 separates a polarization-multiplexed optical signal into two optical signals the polarization planes of which are orthogonal to each other. The polarized waves orthogonal to each other are referred to as an X-polarization wave and a Y-polarization wave, respectively. Each of the two separated optical signals is mixed with the LO light in the 90-degree optical hybrid circuit 222. The 90-degree optical hybrid circuit 222 outputs a beat light signal between an X-polarization optical signal and the LO light, and a beat light signal between a Y-polarization optical signal, and the LO light. The 90-degree optical hybrid circuit 222 according to the present example embodiment outputs an XI signal, a YI signal, an XQ signal, and a YQ signal. The XI signal is an inphase signal included in the X-polarization optical signal. The XQ signal is a quadrature signal included in the X-polarization optical signal, the phase of the XQ signal being orthogonal to that of the I signal. The YI signal is an inphase signal included in the Y-polarization optical signal. The YQ signal is a quadrature signal included in the Y-polarization optical signal. A procedure for separating polarized waves in a polarization-multiplexed optical signal and a procedure for generating an XI signal, an XQ signal, a YI signal, and a YQ signal by a 90-degree optical hybrid circuit are well known, and therefore detailed description thereof is omitted.

The photoelectric converter 230, the amplifier 240, and the ADC 270 operate independently for each of the XI signal, the XQ signal, the YI signal, and the YQ signal. The photoelectric converter 230 converts a beat light signal output from the 90-degree optical hybrid circuit 220 into an analog electric signal (hereinafter referred to as "analog signal"). For example, the photoelectric converter 230 is a photodiode. The amplitudes of the four analog signals output from the photoelectric converter 230 are proportional to the amplitudes of the XI signal, the XQ signal, the YI signal, and the YQ signal, respectively. The analog signals are output to the amplifier 240.

The amplifier 240 amplifies analog signals respectively related to the XI signal, the XQ signal, the YI signal, and the YQ signal that are input from the photoelectric converter 230 and outputs the amplified signals to the ADC 270. The ADC 270 is an analog-to-digital converter and converts the analog signals amplified by the amplifier 240 into digital signals. The digital signals are input to the demodulation unit 280 in the subsequent stage.

As described above, the polarization fluctuation estimation unit 200 may further include the ADC 270. Further, the polarization fluctuation estimation unit 200 may not include the LO 210. The polarization fluctuation estimation unit 200 is one form of a polarization fluctuation estimation device.

The polarization plane of a polarization-multiplexed optical signal rotates due to causes such as external pressure applied to the optical transmission channel 30 and fluctuation of the ambient temperature of the optical transmission channel 30. Therefore, the polarization plane of a polarization-multiplexed optical signal when being polarization-multiplexed by the optical transmitter 10 does not necessarily match the polarization planes of the X-polarization wave and the Y-polarization wave when being coherent-detected by the optical mixer 220. Consequently, Y-polarization components coexist in the XI signal and the XQ signal that are output from the optical mixer 220, and X-polarization components coexist in the YI signal and the YQ signal. The demodulation unit 280 separates a coexisting polarized wave component by digital signal processing. The demodulation unit 280 separates coexisting polarization components included in the XI signal, the XQ signal, the YI signal, and the YQ signal by digital signal processing using a central processing unit (CPU) or a digital signal processor (DSP) and demodulates transmitted data.

On the other hand, an analog signal indicating the amplitude of each of the XI signal, the XQ signal, the YI signal, and the YQ signal is branched from the output of the photoelectric converter 230 and is input to the monitor signal acquisition unit 250. The signal input to the monitor signal acquisition unit 250 is herein referred to as a "monitor signal." The monitor signal acquisition unit 250 is an electric circuit including an analog-to-digital converter, converts the amplitude of the input monitor signal into a digital signal, and outputs the digital signal to the estimation computation unit 260. The estimation computation unit 260 is an electric circuit including a CPU or a DSP, estimates the polarization fluctuation speed of the polarization-multiplexed optical signal, based on the digital signal input from the monitor signal acquisition unit 250, and outputs the estimated polarization fluctuation speed.

Characteristic fluctuation caused by polarization dependency of an optical characteristic and variation among individual electric devices appears in devices and optical fibers used in the optical transmitter 10, the optical receiver 20, and the optical transmission channel 30 as a polarization dependent loss (hereinafter referred to as "PDL"). A PDL causes a level difference between polarized waves in a polarization-multiplexed optical signal. When a PDL does not exist, the output level of each signal output from the optical mixer 220 is not affected by fluctuation of polarization. However, when a PDL exists, a ratio of a polarization component included in an optical signal changes according to polarization of the optical signal. Consequently, a polarization component coexisting in the output signal of the optical mixer 220 fluctuates according to polarization fluctuation of the polarization-multiplexed optical signal during propagation. Specifically, the amplitude of each of the XI signal, the XQ signal, the YI signal, and the YQ signal that are output from the optical mixer 220 fluctuates according to polarization fluctuation. Accordingly, polarization fluctuation speed during propagation can be estimated by monitoring fluctuation of the amplitude (that is, a temporal waveform) of at least one of the XI signal, the XQ signal, the YI signal, and the YQ signal that are output from the optical mixer 220. The estimation result of the polarization fluctuation speed is input to the demodulation unit 280 and is used in minute polarization de-multiplexing processing of the polarization-multiplexed optical signal. An example of specific polarization de-multiplexing processing will be described in a later example embodiment.

The polarization fluctuation estimation unit 200 according to the present example embodiment can estimate the polarization fluctuation speed of an optical signal with a high degree of precision without depending on the type and the state of the optical signal. A first reason is that a monitor signal acquired from the photoelectric converter 230 is a signal based on intensity fluctuation of an optical signal, and therefore polarization fluctuation speed can be estimated regardless of the modulation method or quality of the optical signal, or whether the optical signal can be demodulated. A second reason is that response of the photoelectric converter 230 is sufficiently fast relative to possible polarization fluctuation speed in the optical transmission channel, and estimation of the polarization fluctuation speed is not affected by the response speed of the photoelectric converter 230.

The polarization fluctuation estimation unit 200 may estimate polarization fluctuation speed, based on the amplitude of only one of the XI signal, the XQ signal, the YI signal, and the YQ signal. In this case, the circuit size of and an amount of calculation in the polarization fluctuation estimation unit 200 can be reduced. Further, the polarization fluctuation estimation unit 200 may estimate polarization fluctuation, based on the amplitudes of two or more of the XI signal, the XQ signal, the YI signal, and the YQ signal. Performing statistical processing such as averaging on a plurality of amplitudes used in estimation computation enables a reduced effect of noise. The number of amplitudes to be used may be determined based on the circuit size, the calculation time, and required estimation precision.

Further, when the output of the photoelectric converter 230 is input to the monitor signal acquisition unit 250, the amplifier 240 may be placed outside the polarization fluctuation estimation unit 200. Furthermore, when the amplifier 240 is controlled in such a way as to have a constant gain, the output of the amplifier 240 may be set as a monitor signal.

Second Example Embodiment

Figure 4:
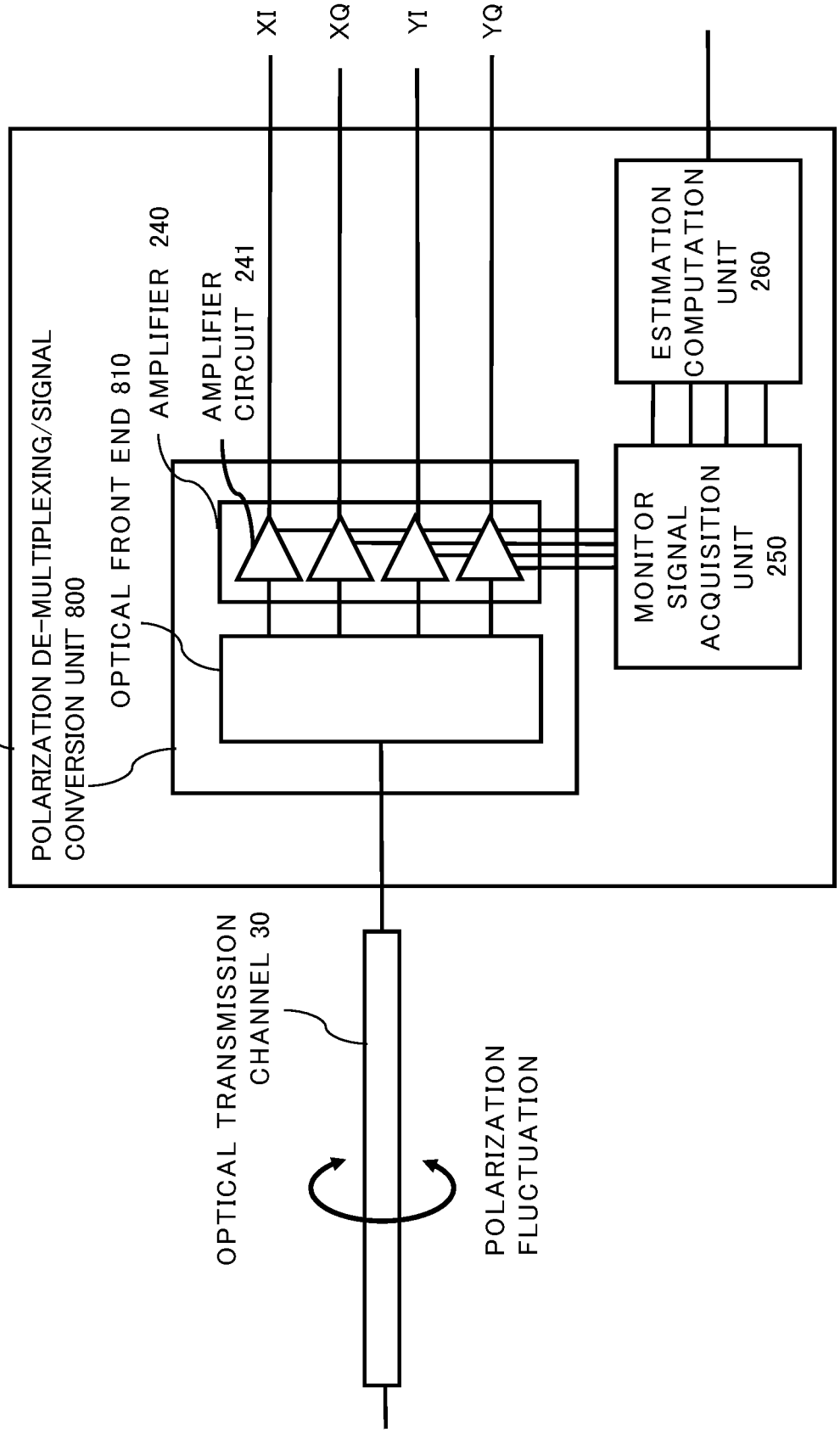
FIG. 4 is a block diagram illustrating a configuration example of a polarization fluctuation estimation unit 201 according to a second example embodiment.

FIG. 4 is a block diagram illustrating a configuration example of a polarization fluctuation estimation unit 201 according to a second example embodiment. The polarization fluctuation estimation unit 201 is used in place of the polarization fluctuation estimation unit 200 according to the first example embodiment. An amplifier 240 included in the polarization fluctuation estimation unit 201 includes four amplifier circuits 241. The amplifier circuits 241 respectively amplify an XI signal, an XQ signal, a YI signal, and a YQ signal. An estimation computation unit 260 included in the polarization fluctuation estimation unit 201 estimates the polarization fluctuation speed of a polarization-multiplexed optical signal, based on the gain of the amplifier circuit 241.

Figure 5:
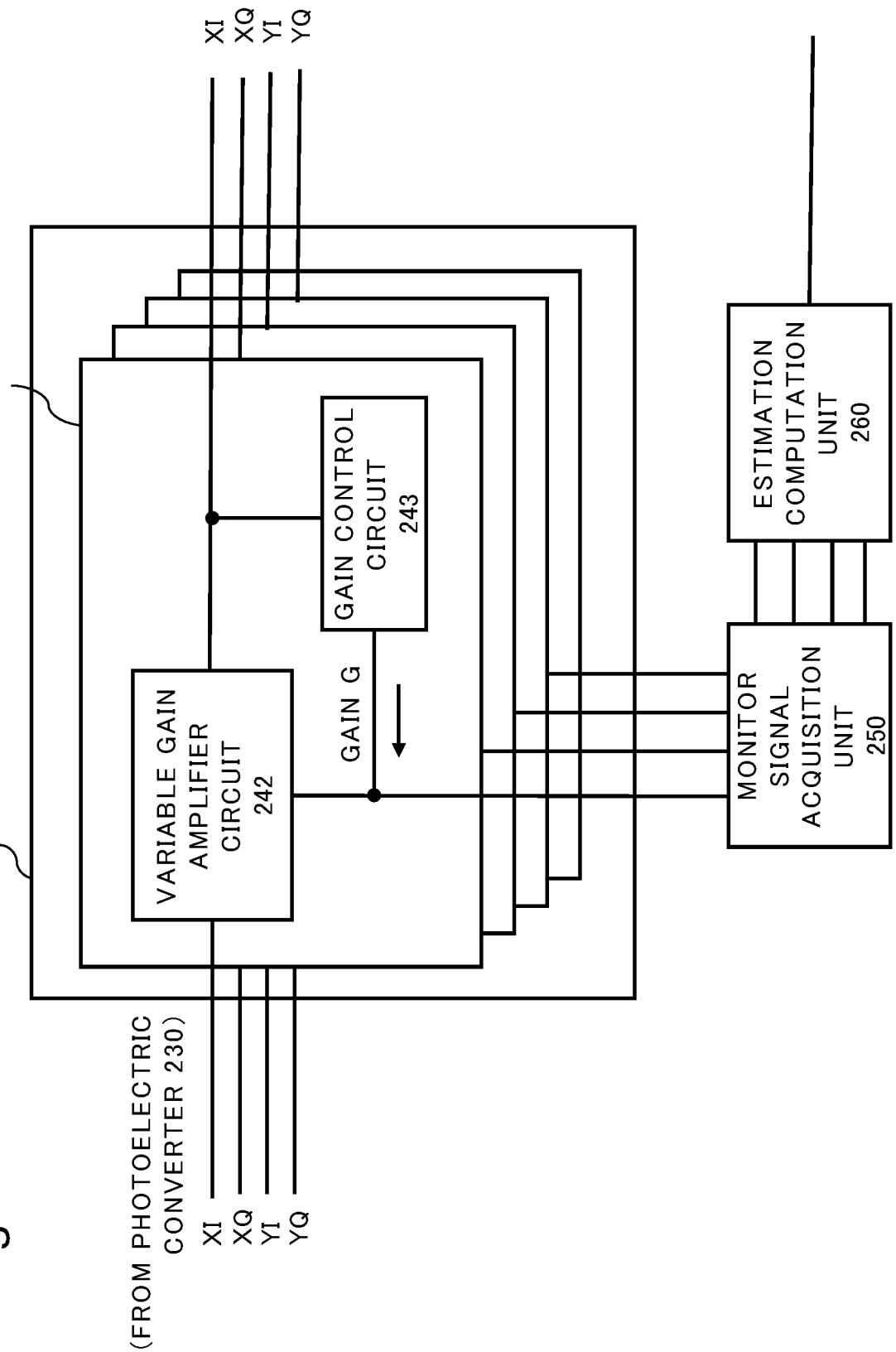
FIG. 5 is a block diagram illustrating a configuration example of an amplifier 240.

FIG. 5 is a block diagram illustrating a configuration example of the amplifier 240 illustrated in FIG. 4. Configurations of the four amplifier circuits 241 included in the amplifier 240 are identical. The amplifier circuit 241 includes a variable gain amplifier circuit 242 and a gain control circuit 243. The gain control circuit 243 adjusts the gain of the variable gain amplifier circuit 242, based on the amplitude of a signal amplified by the variable gain amplifier circuit 242. The gain control circuit 243 according to the present example embodiment performs control in such a way that the amplitude A1 of the output of the variable gain amplifier circuit 242 is constant (hereinafter referred to as "ALC"). Specifically, the gain control circuit 243 controls the gain G of the variable gain amplifier circuit 242 in such a way that the amplitude of the signal output from the variable gain amplifier circuit 242 is a constant value A1. The amplitude A1 may be set in such a way that an input level to the ADC 270 is within a suitable range. The gain control circuit 243 outputs a signal indicating a gain G at which the output signal of the variable gain amplifier circuit 242 has the amplitude A1 to the variable gain amplifier circuit 242. Denoting the amplitude of the signal input from the photoelectric converter 230 to the variable gain amplifier circuit 242 by A0, the gain of the variable gain amplifier circuit 242 by G, and the amplitude of the signal output from the variable gain amplifier circuit 242 by A1, A0×G=A1 holds.

The polarization fluctuation estimation unit 201 differs from the polarization fluctuation estimation unit 200 according to the first example embodiment in using a signal indicating the gain of the amplifier circuit 241 as a monitor signal. Specifically, a signal indicating the gain G for each of the XI signal, the XQ signal, the YI signal, and the YQ signal in the variable gain amplifier circuit 242 is branched from the related output of the gain control circuit 243 and is input to the monitor signal acquisition unit 250 as a monitor signal. The monitor signal acquisition unit 250 is an electric circuit including an analog-to-digital converter and, when an input monitor signal is an analog signal, converts the gain G included in the analog signal into a digital signal and outputs the digital signal to the estimation computation unit 260. When the amplitude of the monitor signal is related to the gain G, the monitor signal acquisition unit 250 converts the amplitude of the monitor signal into a digital signal.

The amplitude of the output signal of the variable gain amplifier circuit 242 is A1. Accordingly, when the variable gain amplifier circuit 242 operates by ALC, the amplitude A0 of each of the XI signal, the XQ signal, the YI signal, and the YQ signal that are output from the photoelectric converter 230 can be easily found as A1/G. According to the first example embodiment, polarization fluctuation speed is estimated by using the output of the photoelectric converter 230 as a monitor signal. However, the estimation computation unit 260 can also estimate polarization fluctuation speed by simple conversion in accordance with a procedure similar to that according to the first example embodiment even when the gain G is used as a monitor signal, as is the case with the present example embodiment.

Further, the polarization fluctuation speed of a polarization-multiplexed optical signal on an optical fiber transmission channel is generally several hundred kHz or less, and response speed of a feedback loop formed by the variable gain amplifier circuit 242 and the gain control circuit 243 is several MHz. Accordingly, temporal fluctuation of the gain G included in a monitor signal can follow polarization fluctuation of the polarization-multiplexed optical signal. Consequently, based on the digital signal output from the monitor signal acquisition unit 250, the estimation computation unit 260 can estimate the polarization rotation speed of the polarization-multiplexed optical signal, the speed being acquired from the monitor signal.

As described above, the polarization fluctuation estimation unit 201 according to the present example embodiment uses a signal indicating the gain G of the variable gain amplifier circuit 242 as a monitor signal. When all of the four amplifier circuits 241 operate by ALC, four signals each indicating the gain G can be used as monitor signals in place of the four output signals of the photoelectric converter 230. Further, when the gain control circuit 243 includes a terminal for externally outputting the gain to be notified to the variable gain amplifier circuit 242, a monitor signal can be easily output to the monitor signal acquisition unit 250 by using the terminal.

Furthermore, the polarization fluctuation estimation unit 201 according to the present example embodiment can estimate the polarization fluctuation speed of an optical signal without depending on the type and the state of the optical signal. A first reason is that a monitor signal acquired from the amplifier 240 is a signal indicating the gain G related to intensity fluctuation of the optical signal, and therefore the polarization fluctuation speed can be estimated without depending on the modulation method and quality of the optical signal. A second reason is that response of the photoelectric converter 230 and response of the amplifier 240 are sufficiently fast relative to possible polarization fluctuation speed in the optical transmission channel, and therefore estimation of the polarization fluctuation speed is not affected by the response speeds of the photoelectric converter 230 and the amplifier 240.

Third Example Embodiment

Figure 6:
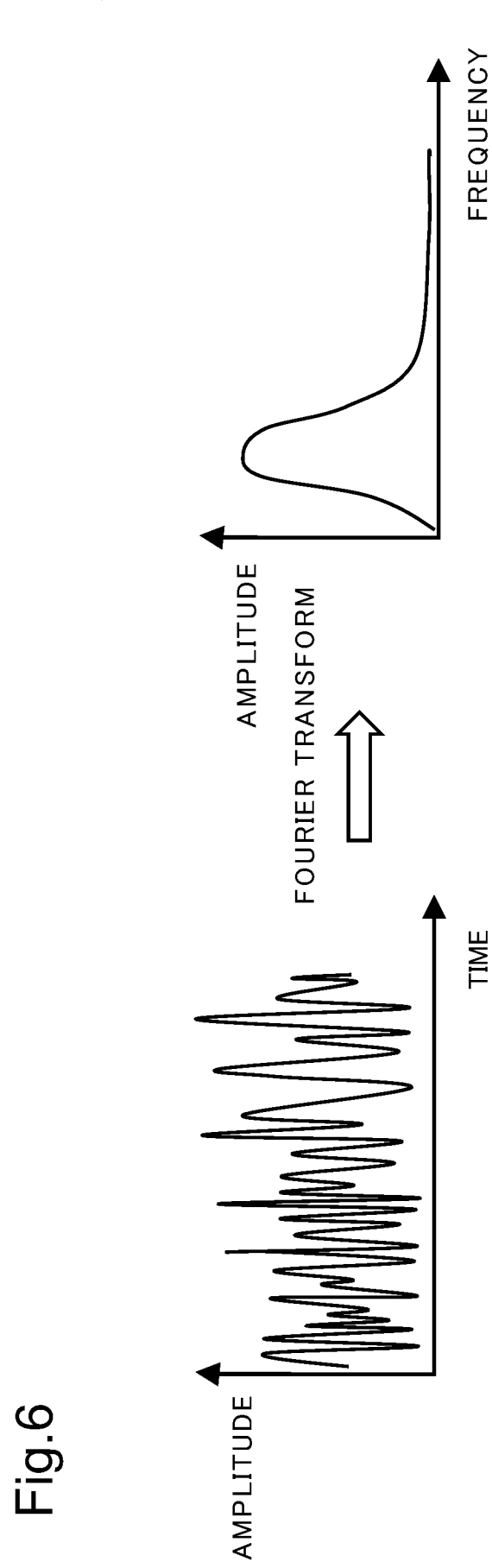
FIG. 6 is a diagram illustrating an example of converting a waveform of a monitor signal from a time domain to a frequency domain.

According to the first and second example embodiments, when a waveform of temporal fluctuation of the amplitude of a monitor signal is converted from a time domain to a frequency domain, frequency response including polarization fluctuation of a polarization-multiplexed optical signal in the optical transmission channel 30 is acquired. FIG. 6 is a diagram illustrating an example of converting a waveform of a monitor signal from a time domain to a frequency domain. The vertical axis in FIG. 6 represents amplitude, and the horizontal axis represents time or frequency. Specifically, the estimation computation unit 260 may Fourier transform temporal fluctuation of the amplitude of the monitor signal (a waveform example on the left side in FIG. 6) by digital computation and estimate polarization fluctuation speed, based on an acquired frequency spectrum (a waveform example on the right side in FIG. 6). The waveforms in FIG. 6 are for illustrating a concept of conversion from a time domain to a frequency domain and do not represent actual waveforms.

Both the fluctuation speed of the amplitude of an analog signal output from the photoelectric converter 230 included in the optical front end 810 and the fluctuation speed of the ALC controlled gain G of the variable gain amplifier circuit 242 include speed of the intensity of a polarized-wave-separated optical signal fluctuated by a PDL. Therefore, analysis of fluctuation of the amplitude of a monitor signal in a frequency domain facilitates analysis of the fluctuation speed of the monitor signal and enables estimation of the polarization fluctuation speed of the optical signal in a shorter time.

Modified Example of Third Example Embodiment

Further, the estimation computation unit 260 may perform smoothing on the frequency spectrum of a monitor signal. For example, smoothing of the frequency spectrum may be performed by expansion of resolution of a band-pass filter when the frequency spectrum of the monitor signal is calculated. Further, temporal statistical processing (such as averaging) may be performed on the calculated frequency spectrum. The aforementioned processing enables a reduced effect of noise included in estimated polarization fluctuation speed and improved precision.

Alternatively, the estimation computation unit 260 may perform smoothing on a monitor signal in a time domain. For example, the estimation computation unit 260 may cause a monitor signal before undergoing a Fourier transform to pass through a band-pass filter or a low-pass filter.

Fourth Example Embodiment

Figure 7:
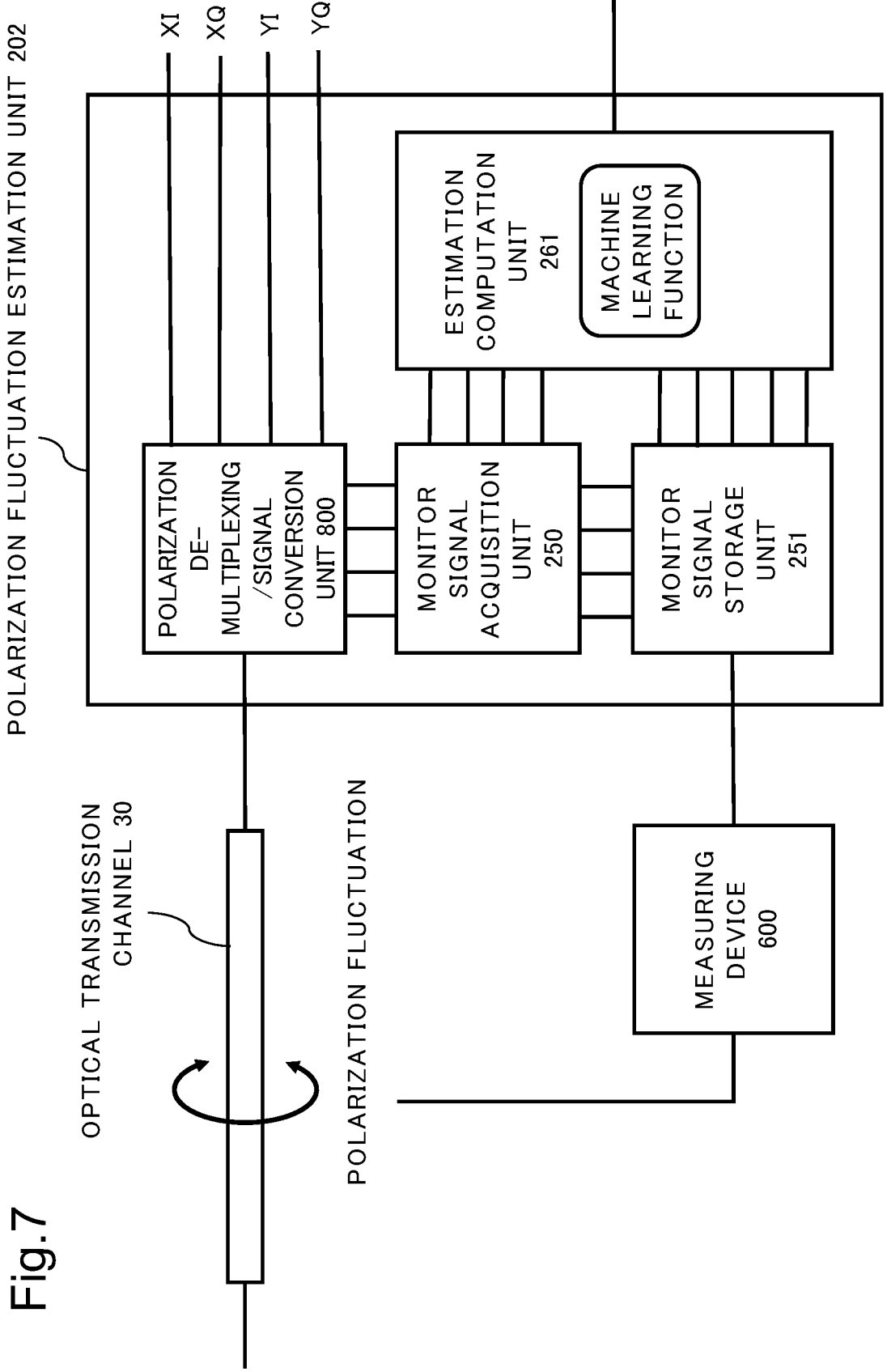
FIG. 7 is a block diagram illustrating a configuration example of a polarization fluctuation estimation unit 202 according to a fourth example embodiment.

An example of applying machine learning to estimation of polarization fluctuation speed will be described in the present example embodiment. FIG. 7 is a block diagram illustrating a configuration example of a polarization fluctuation estimation unit 202 according to the present example embodiment. Compared with the previously described polarization fluctuation estimation unit 201, the polarization fluctuation estimation unit 202 includes a monitor signal storage unit 251 and includes an estimation computation unit 261 in place of the estimation computation unit 260. A measuring device 600 is placed outside the polarization fluctuation estimation unit 202. The measuring device 600 is a common measuring instrument capable of outputting an actual measurement of polarization fluctuation speed in an optical transmission channel 30.

The monitor signal storage unit 251 stores a digitized monitor signal generated by a monitor signal acquisition unit 250. In particular, when the polarization fluctuation speed of a polarization-multiplexed optical signal related to a stored monitor signal is known, the monitor signal storage unit 251 stores the known polarization fluctuation speed and a monitor signal related to the polarization fluctuation speed in association with each other. The measuring device 600 notifies an actual measurement of polarization fluctuation speed to the monitor signal storage unit 251 as known polarization fluctuation speed. The monitor signal storage unit 251 stores the known polarization fluctuation speed notified by the measuring device 600 in association with a monitor signal input from the monitor signal acquisition unit 250. After acquiring an actual measurement of polarization fluctuation speed from the measuring device 600, the monitor signal storage unit 251 may acquire a monitor signal related to the actual measurement from the monitor signal acquisition unit 250. Further, for one actual measurement of polarization fluctuation speed, a plurality of related monitor signals may be stored. The stored monitor signal and the stored polarization fluctuation speed are used in a learning phase of a machine learning function to be described below.

The estimation computation unit 261 provides the function of the previously described estimation computation unit 260 by a machine learning function. The machine learning function includes two operation modes being a learning phase and an operation phase. In the learning phase, a model for estimating polarization fluctuation speed is generated. In the operation phase, the polarization fluctuation speed of a received polarization-multiplexed optical signal is estimated by using the generated model. The machine learning function can be provided by hardware of the estimation computation unit 261, a program executable in the estimation computation unit 261, or a combination of the two. Either one of two forms of monitor signal being data in a time domain (a temporal waveform) and data in a frequency domain (a spectrum) may be used in the machine learning.

Figure 8:
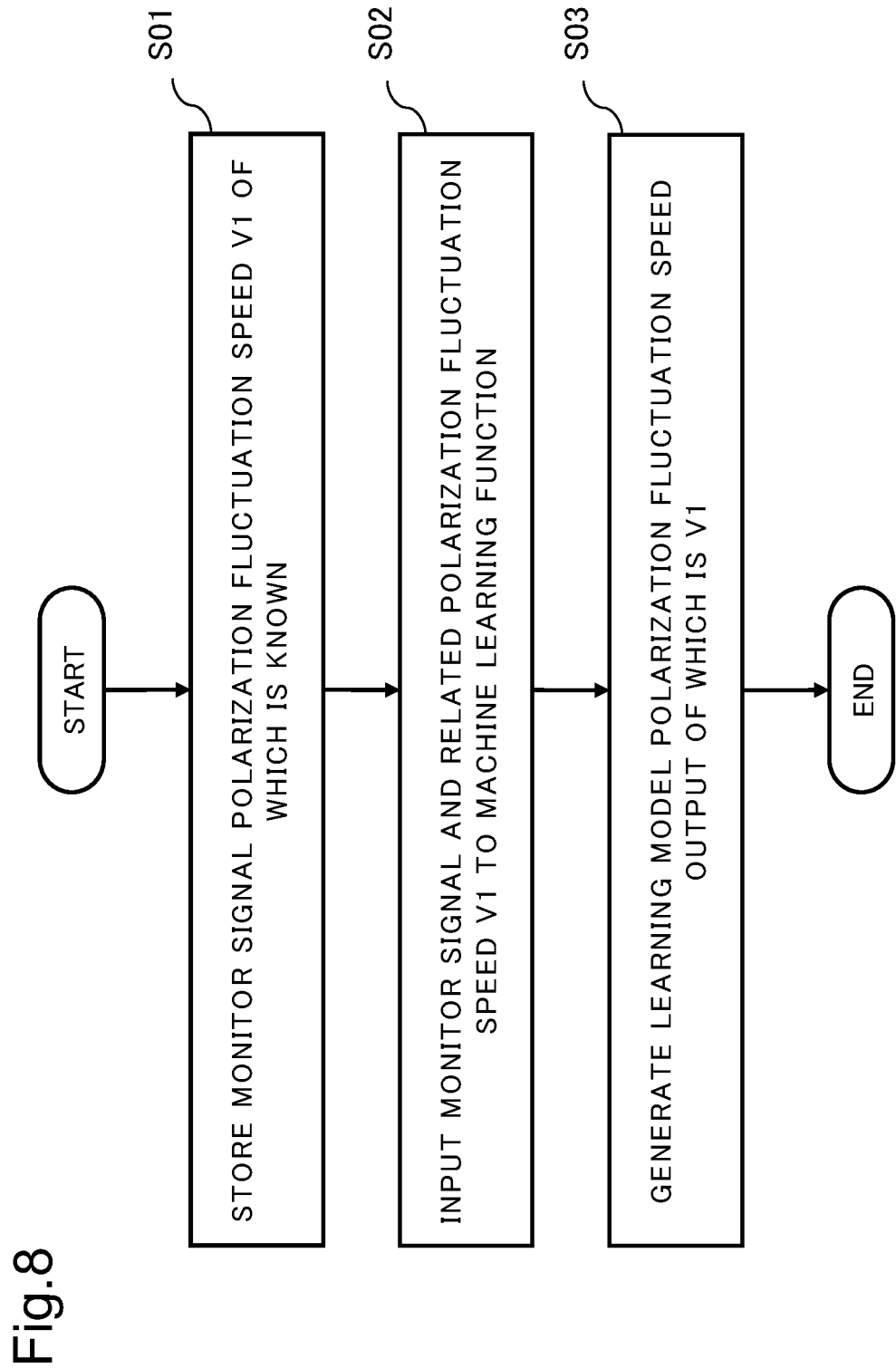
FIG. 8 is a diagram for describing a learning phase in machine learning.
Figure 9:
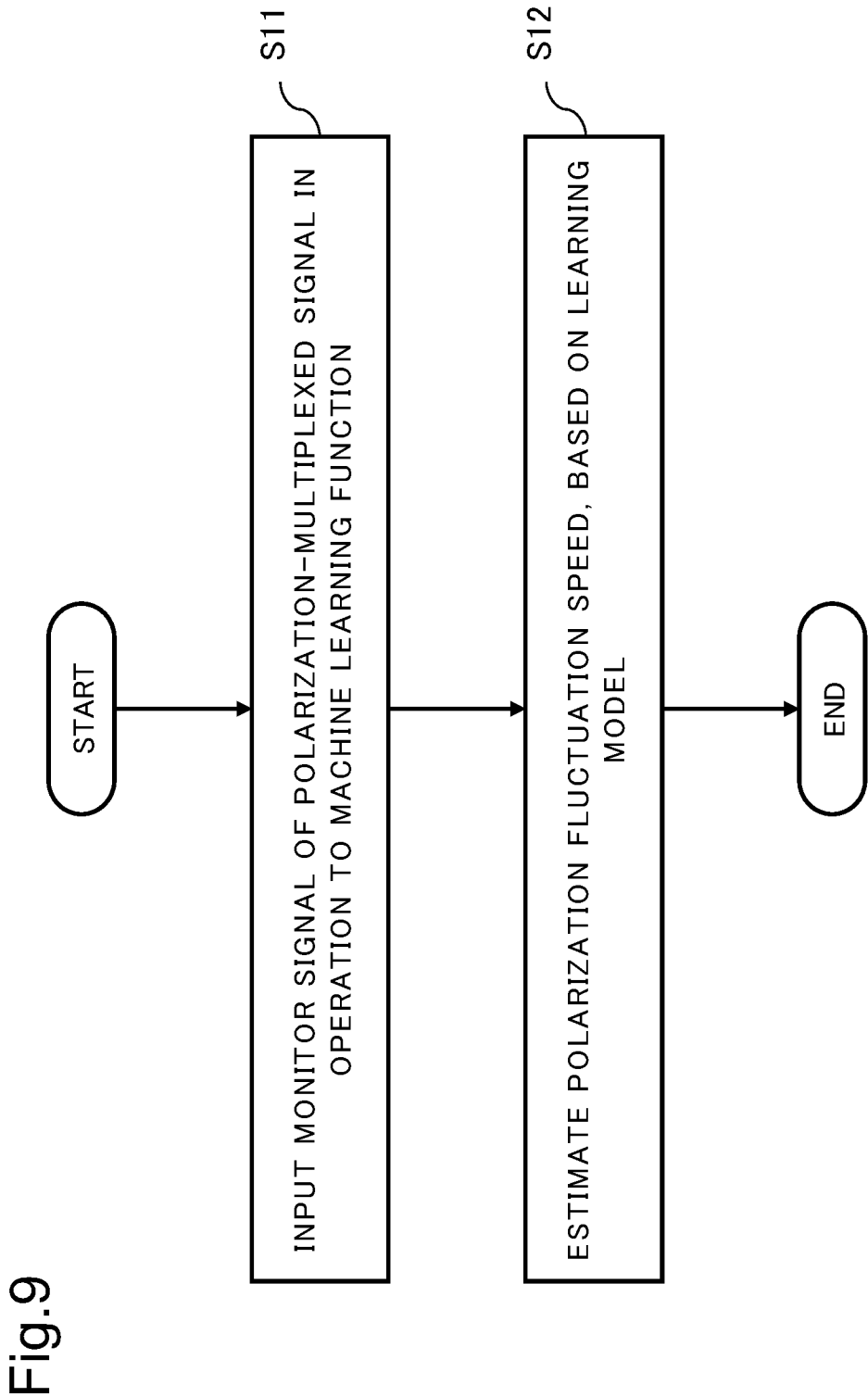
FIG. 9 is a diagram for describing an operation phase in the machine learning.

FIG. 8 and FIG. 9 are flowcharts for describing procedures for the learning phase and the operation phase in the machine learning, respectively. In the learning phase, the monitor signal storage unit 251 stores a digitized monitor signal the polarization fluctuation speed of which is known (such as V1) (Step S01 in FIG. 8). The stored monitor signal may be generated by causing a polarization-multiplexed optical signal to propagate through a transmission channel the polarization fluctuation speed of which is known. The known polarization fluctuation speed V1 is notified to the monitor signal storage unit 251 from the measuring device 600. In addition to a monitor signal required for learning, the estimation computation unit 261 acquires a known polarization fluctuation speed V1 related to the monitor signal from monitor signals and polarization fluctuation speeds that are stored in the monitor signal storage unit 251. The estimation computation unit 261 inputs the acquired monitor signal and the known polarization fluctuation speed V1 related to the monitor signal to the machine learning function (Step S02). From the input monitor signal, the machine learning function generates a model a polarization fluctuation speed output of which is V1 (Step S03). The estimation computation unit 261 stores the generated learning model. The machine learning function generates a model for classifying polarization fluctuation speeds by extracting feature values quantitatively representing features of data of a plurality of monitor signals the polarization fluctuation speeds of which are different from each other.

In the operation phase, a monitor signal of a polarization-multiplexed optical signal in operation is input to the machine learning function (Step S11 in FIG. 9). In the operation phase, a monitor signal in a form identical to that in the learning phase (that is, a temporal waveform or a spectrum) is input to the machine learning function. The machine learning function applies the learning model generated in the learning phase to the input data, and estimates and outputs polarization fluctuation speed (Step S12).

The polarization fluctuation estimation unit 202 according to the present example embodiment estimates polarization fluctuation speed, based on a monitor signal, similarly to the polarization fluctuation estimation unit 201 described in the second example embodiment. Therefore, the polarization fluctuation estimation unit 202 can estimate the polarization fluctuation speed of a received signal with a high degree of precision without depending on quality of the received signal.

Furthermore, in the learning phase of the machine learning function, the polarization fluctuation estimation unit 202 generates a model, based on polarization fluctuation speed measured by the measuring device 600 and a related monitor signal. Then, in the operation phase of the machine learning function, the polarization fluctuation estimation unit 202 estimates polarization fluctuation speed, based on a monitor signal of a received polarization-multiplexed optical signal, by the machine learning function using the model. The estimation procedure of polarization fluctuation by the polarization fluctuation estimation unit 202 with such a configuration provides an effect that the polarization fluctuation speed of a received signal can be estimated with a higher degree of precision compared with a case of using only the procedures according to the first to third example embodiments and the common measuring device 600.

Fifth Example Embodiment

Estimation procedures of the polarization fluctuation speed of a polarization-multiplexed optical signal have been described in the first to fourth example embodiments. Estimation of abnormality of the optical transmission channel 30 using machine learning will be described in the present example embodiment.

A monitor signal when the optical transmission channel 30 is in a normal state and a monitor signal when the optical transmission channel 30 is in an abnormal state are previously stored in the monitor signal storage unit 251 as learning data in association with the states of the optical transmission channel 30. The states of the optical transmission channel 30 include the normal state and a plurality of abnormal states different from each other. A plurality of monitor signals may be prepared for one state of the optical transmission channel 30. Abnormal states of the optical transmission channel 30 include increase in oscillation in and pressure on the optical transmission channel 30, and rise in the ambient temperature. Furthermore, for example, a failure of an optical device included in each of an optical transmitter, an optical repeater, or an optical receiver that are connected to the optical transmission channel 30 may be included in abnormal states. Learning data in the normal state and abnormal states can be collected when the states of the optical transmission channel and the communication equipment are known.

In the learning phase, a machine learning function according to the present example embodiment generates a model for estimating the state of the optical transmission channel 30 by using a monitor signal stored in the monitor signal storage unit 251 and the state of the optical transmission channel 30 related to the monitor signal. Then, in the operation phase, the machine learning function applies the model to a monitor signal related to a polarization-multiplexed optical signal in operation. Specifically, in the learning phase, the machine learning function generates a model for classifying states of a normal transmission channel and an abnormal transmission channel by extracting feature values quantitatively representing features of learning data for the normal state and the abnormal state. Then, in the operation phase, the machine learning function applies the generated model to a monitor signal of a polarization-multiplexed optical signal in operation and estimates the state of a transmission channel, based on the application result.

The configuration including the machine learning function described in the fourth and fifth example embodiments may be applied to another example embodiment herein. For example, the optical receiver 20 can estimate the polarization fluctuation speed of a polarization-multiplexed optical signal by using the machine learning function and can also estimate abnormality of the optical transmission system 1. The monitor signal storage unit 251 according to the fourth and fifth example embodiments may generate a monitor signal related to any polarization fluctuation speed as a digital signal by simulation and store the generated monitor signal. Further, the estimation computation unit 261 may store a learning model generated by a machine learning function included in another device and estimate polarization fluctuation speed and abnormality of an optical transmission channel, based on the model.

Another Modified Example of First to Fifth Example Embodiments

The estimation computation units 260 and 261 may detect abnormality of an optical transmission channel with occurrence of a unique value of estimated polarization fluctuation speed as a trigger, without using a machine learning function. For example, a trigger being occurrence of a unique value refers to an instantaneous value of the amplitude of a monitor signal exceeding a threshold value, power fluctuation in a band at a predetermined frequency or higher in the frequency spectrum of the monitor signal, or power fluctuation in a predetermined frequency band.

Four monitor signals related to the XI signal, the XQ signal, the YI signal, and the YQ signal are input to the estimation computation unit 260 or 261, according to the first to fifth example embodiments. The estimation computation units 260 and 261 may appropriately select the monitor signals and estimate polarization fluctuation speed or an abnormal state. For example, the estimation computation units 260 and 261 may find and output the mean value of polarization fluctuation speeds estimated from the input monitor signals. The estimation computation units 260 and 261 may use, in estimation, one monitor signal or two to four monitor signals combined based on polarization (X, Y) and phase (I, Q). Such selection of monitor signals is used in improvement of estimation precision of polarization fluctuation speed and abnormality. Further, the estimation computation units 260 and 261 according to the fifth example embodiment may output every abnormal state estimated from each input monitor signal.

Sixth Example Embodiment

Figure 10:
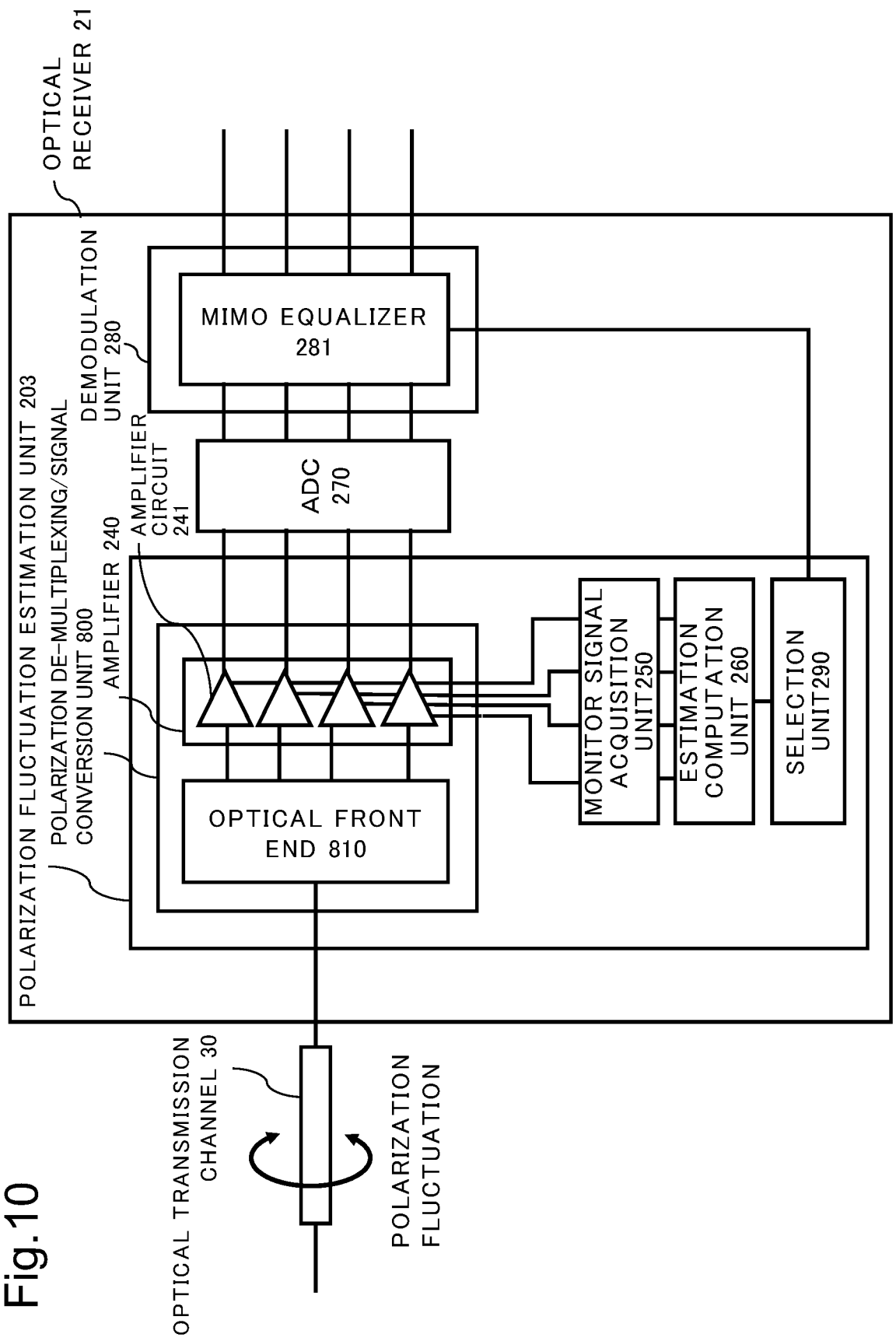
FIG. 10 is a diagram illustrating a configuration example of an optical receiver 21 according to a sixth example embodiment.

FIG. 10 is a diagram illustrating a configuration example of an optical receiver 21 according to a sixth example embodiment. The optical receiver 21 includes a polarization fluctuation estimation unit 203, an ADC 270, and a demodulation unit 280. The ADC 270 may be included in the polarization fluctuation estimation unit 203. The polarization fluctuation estimation unit 203 includes a selection unit 290, and the demodulation unit 280 includes a multi-input multi-output (MIMO) equalizer 281. The selection unit 290 selects a step-size parameter μ used by the MIMO equalizer 281, based on an estimated value of polarization fluctuation speed estimated by an estimation computation unit 260 or 261. The MIMO equalizer 281 eliminates unnecessary polarization components included in X-polarization signals (an XI signal and an XQ signal) and Y-polarization signals (a YI signal and a YQ signal) that are converted into digital signals by the ADC 270, based on the step-size parameter μ. The MIMO equalizer 281 thus provides the X-polarization signals and the Y-polarization signals that are polarized-wave-separated minutely for the input of the next processing in the demodulation unit 280.

Figure 11:
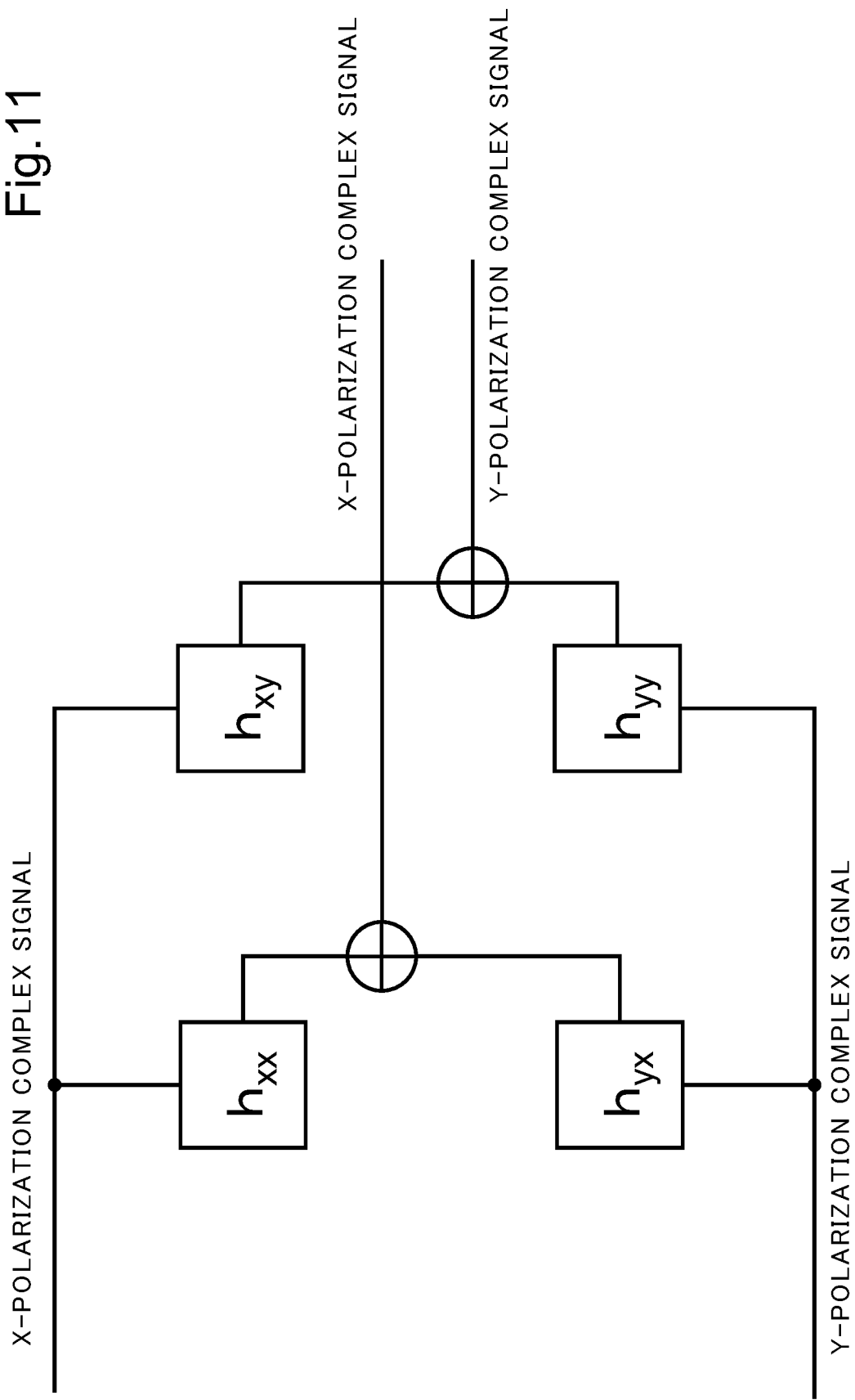
FIG. 11 is a diagram illustrating a configuration example of a MIMO equalizer 281.

FIG. 11 is a diagram illustrating a configuration example of the MIMO equalizer 281. The MIMO equalizer 281 is an adaptive equalizer with an X-polarization signal and a Y-polarization signal as inputs. By updating tap coefficients of an FIR filter (hxx, hxy, hyx, and hyy in FIG. 11) in accordance with the following equation (1) described in PTL 2, the MIMO equalizer 281 compensates for polarization fluctuation of an X-polarization complex signal and performs polarization de-multiplexing of the X-polarization signal and the Y-polarization signal.

$$\begin{cases} h_{xx}(n+1) = h_{xx}(n) + \mu\varepsilon_x(n)x_{out}(n) \cdot x_{in}^* \\ h_{xy}(n+1) = h_{xy}(n) + \mu\varepsilon_x(n)x_{out}(n) \cdot y_{in}^* \\ h_{yx}(n+1) = h_{yx}(n) + \mu\varepsilon_y(n)y_{out}(n) \cdot x_{in}^* \\ h_{yy}(n+1) = h_{yy}(n) + \mu\varepsilon_y(n)y_{out}(n) \cdot y_{in}^* \end{cases} \quad (1)$$

The polarization fluctuation speed estimated by the estimation computation unit 260 or 261 is input to the selection unit 290. The selection unit 290 holds a table associating polarization fluctuation speed with the value of μ used in equation (1). Note that μ (step-size parameter) is a value defining the size of an update step of a coefficient of the FIR filter. The step-size parameter μ may be a predetermined value or a value set based on the fluctuation speed of a polarization state. The selection unit 290 according to the present example embodiment selects an optimum value of the step-size parameter μ from the table, based on the estimated value of polarization fluctuation speed, and outputs the selected value to the MIMO equalizer 281. Based on the value of μ input from the selection unit 290, the MIMO equalizer 281 performs computation for polarization de-multiplexing of an X-polarization signal and a Y-polarization signal in accordance with equation (1). Computation of the FIR filter coefficient in the MIMO equalizer 281 can be performed by computation by a CPU or a DSP, or by hardware logic.

Decreasing μ enables more precise polarization de-multiplexing and decreases a demodulation error but decreases polarization tracking speed. Conversely, increasing μ decreases polarization de-multiplexing precision and increases a demodulation error but improves polarization tracking speed. In this example, a demodulation error is minimized by selecting a suitable μ based on estimated polarization fluctuation speed of a transmission channel.

A monitor signal acquired by a monitor signal acquisition unit 250 from an amplifier 240 in the polarization fluctuation estimation unit 203 according to the present example embodiment is also a signal based on intensity fluctuation of an optical signal. Therefore, the estimation computation unit 260 or 261 can estimate polarization fluctuation speed regardless of the modulation method or quality of the optical signal, or whether the optical signal can be demodulated. Further, response of a photoelectric converter 230 and response of the amplifier 240 are sufficiently fast relative to possible polarization fluctuation speed in an optical transmission channel 30, and intensity fluctuation of a polarized-wave-separated optical signal is reflected in a monitor signal. Accordingly, the polarization fluctuation estimation unit 203 can estimate the polarization fluctuation speed of a polarization-multiplexed optical signal without depending on the operation speed of the adaptive equalizer. Consequently, the selection unit 290 can provide a more preferable step-size parameter μ for the MIMO equalizer 281.

Seventh Example Embodiment

Figure 12:
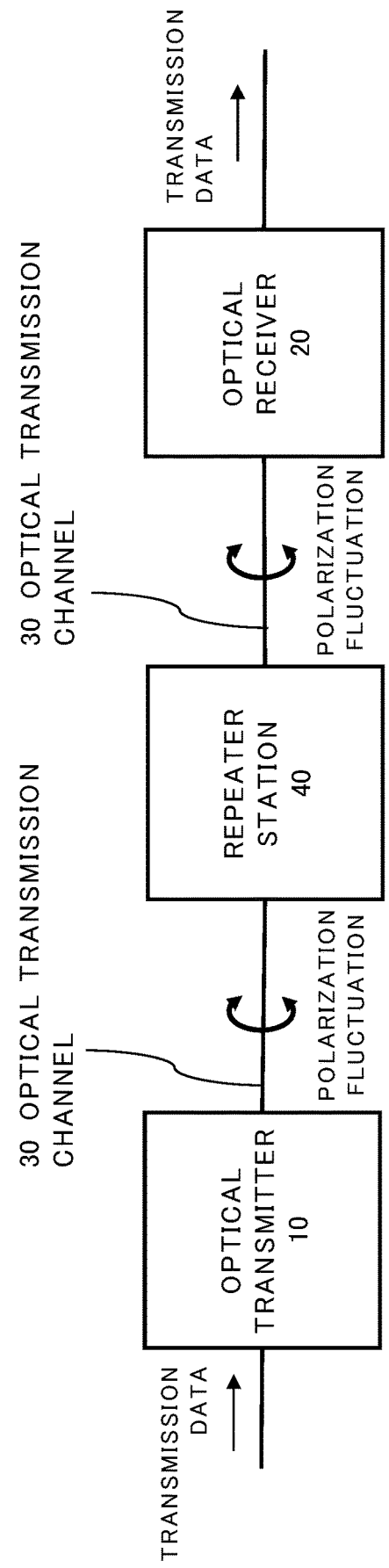
FIG. 12 is a block diagram illustrating a configuration example of an optical transmission system 2 according to a seventh example embodiment.

FIG. 12 is a block diagram illustrating a configuration example of an optical transmission system 2 according to a seventh example embodiment of the present invention. The optical transmission system 2 includes an optical transmitter 10, an optical receiver 20, an optical transmission channel 30, and a repeater station 40. The repeater station 40 relays a polarization-multiplexed optical signal propagating through the optical transmission channel 30. The polarization-multiplexed optical signal propagates from the optical transmitter 10 to the optical receiver 20. The repeater station 40 is a repeater station installed terrestrially or underseas. A plurality of repeater stations 40 may be placed between the optical transmitter 10 and the optical receiver 20. Repeater stations 40 are installed for every several tens of kilometers in a common polarization-multiplexed optical signal transmission system. The repeater station 40 is a configuration example of a repeater.

Figure 13:
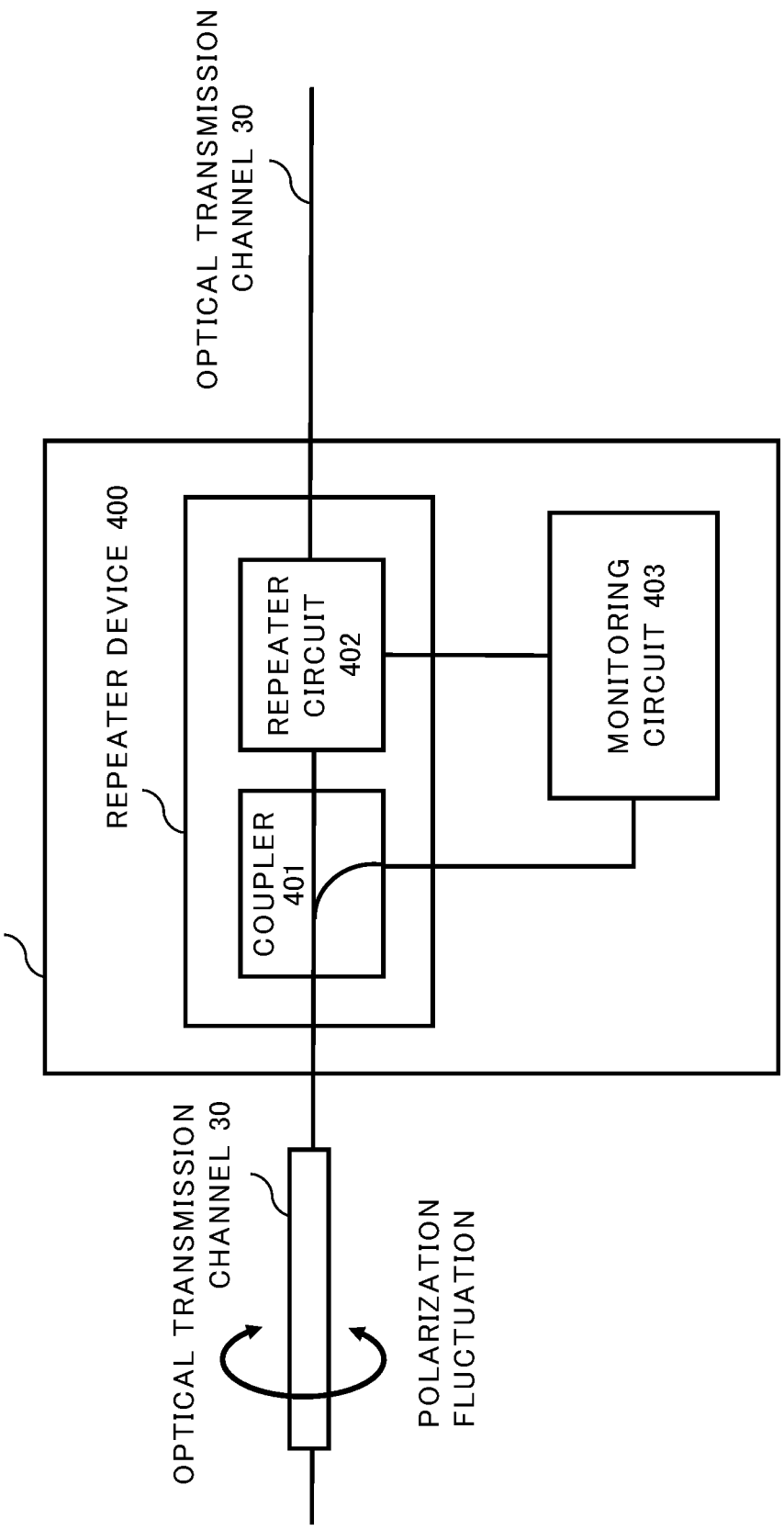
FIG. 13 is a block diagram illustrating a configuration example of a repeater station 40.

FIG. 13 is a block diagram illustrating a configuration example of the repeater station 40. The repeater station 40 includes a repeater device 400 and a monitoring circuit 403. The repeater device 400 performs amplification and waveform shaping of a polarization-multiplexed optical signal propagating through the optical transmission channel 30 by using an optical amplifier and an optical filter.

A coupler 401 is an optical branching device. The coupler 401 branches a polarization-multiplexed optical signal input from the optical transmission channel 30, outputs one of the branched signals to a repeater circuit 402, and outputs the other to the monitoring circuit 403. The repeater circuit 402 performs amplification and waveform shaping of a polarization-multiplexed optical signal by using an optical amplifier and an optical filter and outputs the polarization-multiplexed optical signal undergoing the processing to the optical transmission channel 30 in the next repeater section.

The monitoring circuit 403 acquires a signal acquired by photoelectrically converting a polarization-multiplexed optical signal as a monitor signal and outputs a signal acquired by analog-to-digital converting the monitor signal to the repeater circuit 402. The repeater circuit 402 superposes the monitor signal input from the monitoring circuit 403 onto an optical signal in a monitor line in the optical transmission system 2 (hereinafter referred to as "monitor light") and sends out the resulting signal to the optical transmission channel 30. The monitor light is transmitted to the optical receiver 20 through the optical transmission channel. The optical receiver 20 receiving the monitor light can estimate the polarization fluctuation speed of the polarization-multiplexed optical signal received by the repeater station 40 by using the function of the estimation computation units 260 and 261 described in the previous example embodiments, based on a monitor signal extracted from the monitor light received from the repeater station 40.

Figure 14:
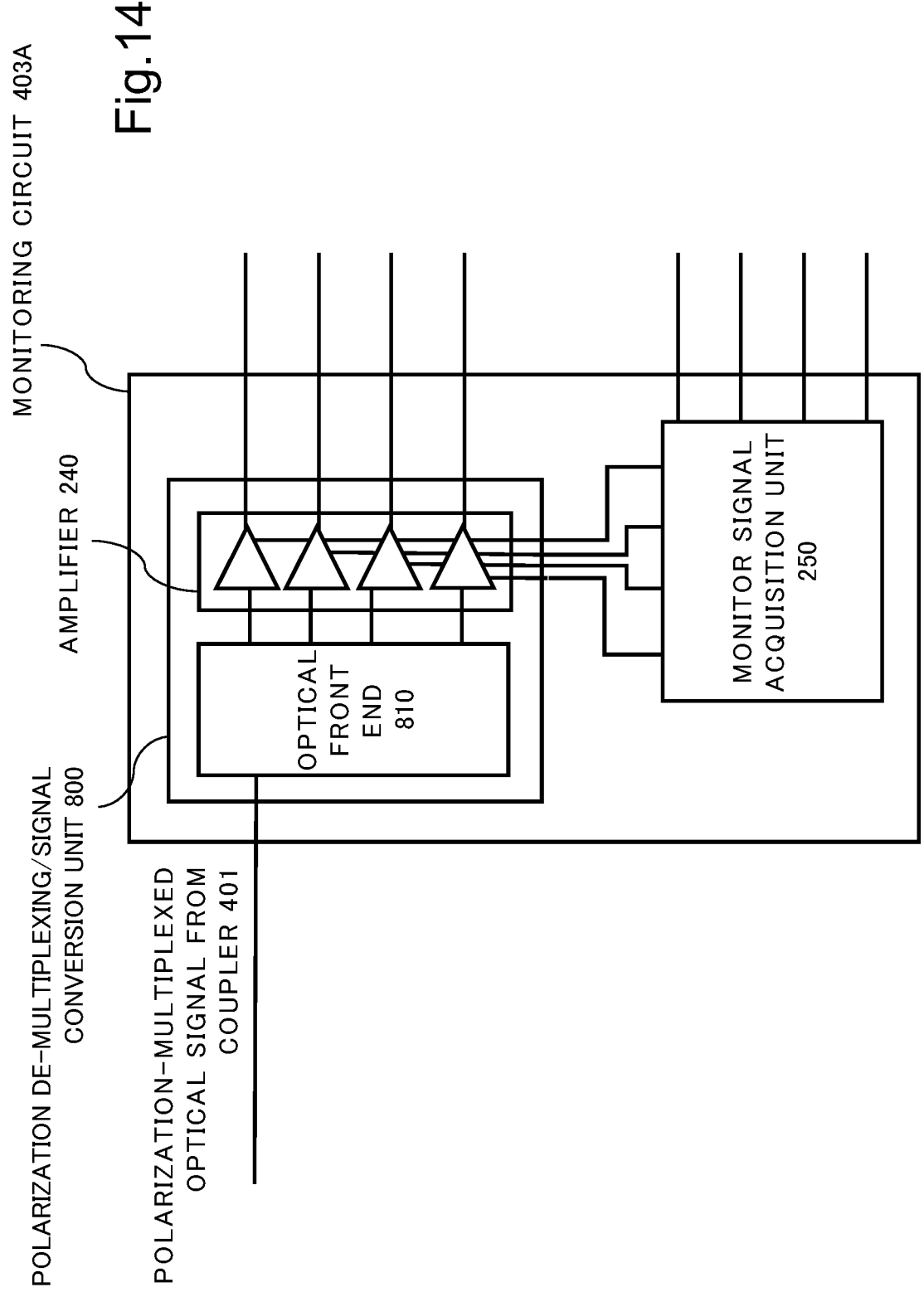
FIG. 14 is a block diagram illustrating a configuration example of a monitoring circuit 403A.
Figure 15:
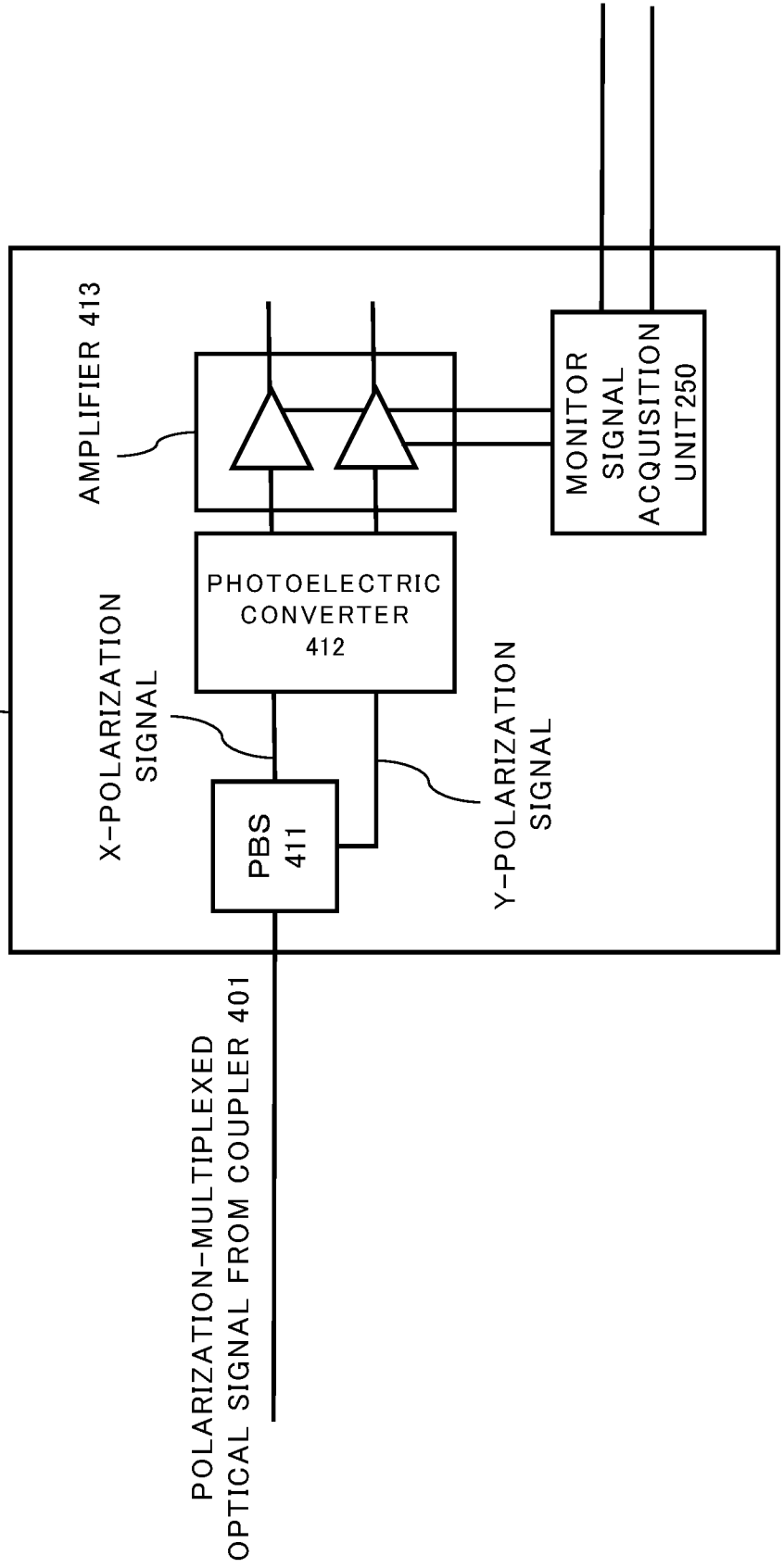
FIG. 15 is a block diagram illustrating a configuration example of a monitoring circuit 403B.
Figure 16:
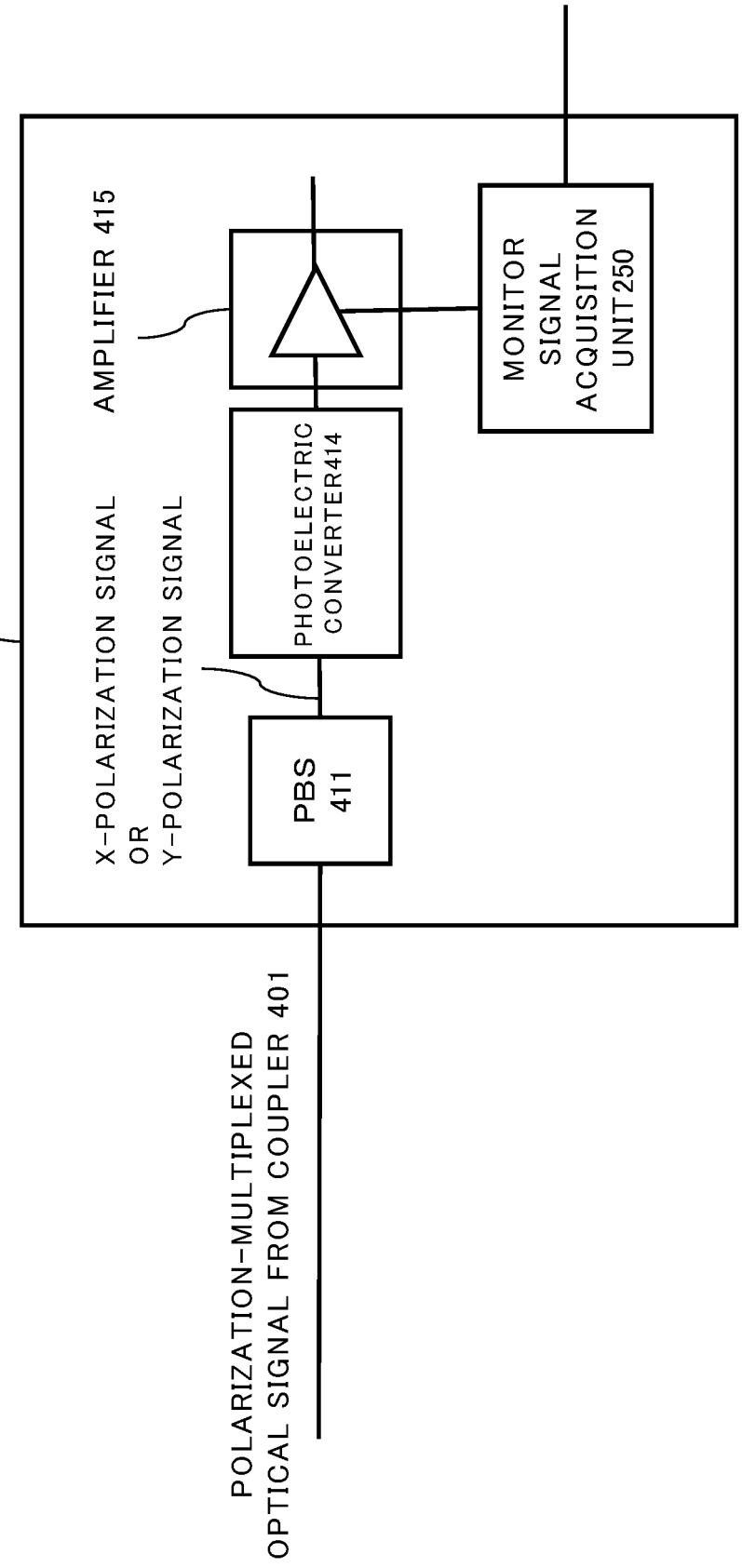
FIG. 16 is a block diagram illustrating a configuration example of a monitoring circuit 403C.

FIG. 14 to FIG. 16 are block diagrams illustrating monitoring circuits 403A to 403C being configuration examples of the monitoring circuit 403, respectively.

FIG. 14 is a block diagram illustrating a configuration example of the monitoring circuit 403A. The monitoring circuit 403A includes an LO 210, an optical mixer 220, a photoelectric converter 230, an amplifier 240, and a monitor signal acquisition unit 250 that are included in the polarization fluctuation estimation unit 201 illustrated in FIG. 4. A polarization-multiplexed optical signal branched by the coupler 401 is input to the monitoring circuit 403A. A procedure for outputting a monitor signal based on the polarization-multiplexed optical signal to the monitor signal acquisition unit 250 and outputting the monitor signal as a digital signal by the monitor signal acquisition unit 250 in the monitoring circuit 403A is similar to that according to the second example embodiment. The monitor signal acquisition unit 250 outputs the monitor signal converted into the digital signal to the repeater circuit 402.

FIG. 15 is a block diagram illustrating a configuration example of the monitoring circuit 403B. The monitoring circuit 403B includes a PBS 411, a photoelectric converter 412, an amplifier 413, and a monitor signal acquisition unit 250. The polarization-multiplexed optical signal branched by the coupler 401 is separated, by the PBS 411, into two optical signals being an X-polarization optical signal and a Y-polarization optical signal the polarization planes of which are orthogonal to each other. Each of the two separated optical signals is input to the photoelectric converter 412 and is converted into an analog signal. For example, the photoelectric converter 412 is a photodiode. The amplifier 413 amplifies each of an analog signal related to the X-polarization optical signal and an analog signal related to the Y-polarization optical signal. When the amplifier 413 operates by ALC, a monitor signal related to the gain G of each of two amplifier circuits included in the amplifier 413 is input to the monitor signal acquisition unit 250, similarly to the second example embodiment. The monitor signal acquisition unit 250 outputs the monitor signal converted into a digital signal to the repeater circuit 402.

FIG. 16 is a block diagram illustrating a configuration example of the monitoring circuit 403C. The monitoring circuit 403C includes a PBS 411, a photoelectric converter 414, an amplifier 415, and a monitor signal acquisition unit 250. The PBS 411 outputs only an optical signal on either one of an X-polarization wave and a Y-polarization wave the polarization planes of which are orthogonal to each other to the photoelectric converter 414. A polarizing plate may be used in place of the PBS 411 in the monitoring circuit 403C. Only an optical signal on either one of an X-polarization wave and a Y-polarization wave can be output to the photoelectric converter 414 also by using the polarizing plate. For example, the photoelectric converter 414 is a photodiode. The amplifier 415 amplifies an analog signal with the photoelectric converter 414. When the amplifier 415 operates by ALC, a monitor signal related to the gain G of an amplifier circuit included in the amplifier 413 is input to the monitor signal acquisition unit 250. The monitor signal acquisition unit 250 outputs the monitor signal converted into a digital signal to the repeater circuit 402.

Based on a polarization-multiplexed optical signal propagating through the optical transmission channel 30, each of the monitoring circuits 403A to 403C described in FIG. 14 to FIG. 16 generates a digital signal including information about the polarization fluctuation speed of the optical signal. The repeater station 40 transmits the digital signal to the optical receiver 20 by using the monitor line. Consequently, the optical transmission system 2 including the repeater station 40 including one of the monitoring circuits 403A to 403C can estimate the polarization fluctuation speed of a polarization-multiplexed optical signal input to the repeater station 40. When the optical transmitter 10 includes the estimation computation unit 260 or 261, the repeater station 40 may transmit monitor light to the optical transmitter 10. Thus, polarization fluctuation speed can be estimated also by the optical transmitter 10.

First Modified Example of Seventh Example Embodiment

Figure 17:
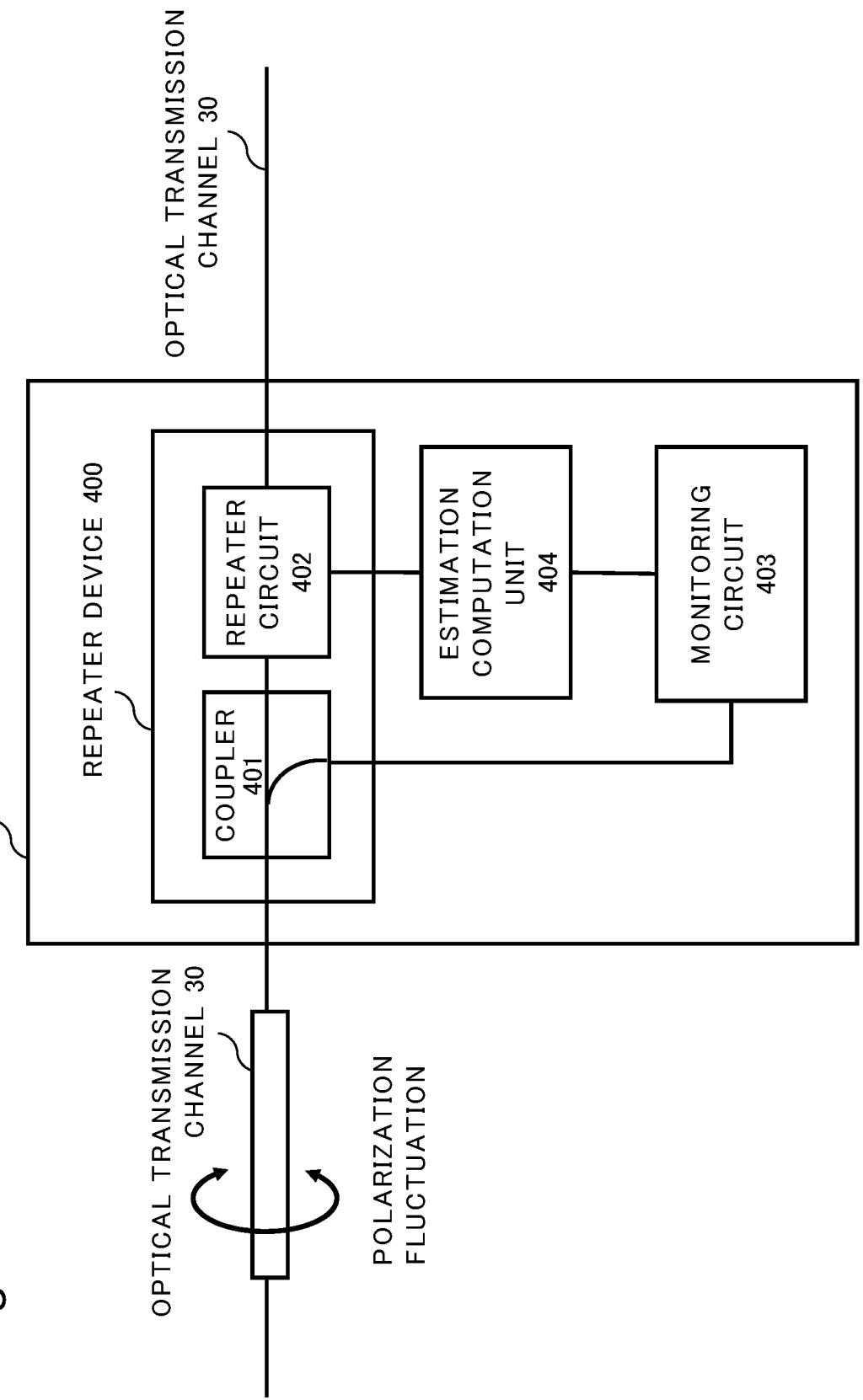
FIG. 17 is a block diagram illustrating a configuration example of a repeater station 40A.

FIG. 17 is a block diagram illustrating a configuration example of a repeater station 40A being a modified example of the repeater station 40. The repeater station 40A includes an estimation computation unit 404 in addition to a repeater device 400 and a monitoring circuit 403. The monitoring circuit 403 included in the repeater station 40A outputs a signal acquired by analog-to-digital converting a monitor signal to the estimation computation unit 404. The estimation computation unit 404 estimates the polarization fluctuation speed of a polarization-multiplexed optical signal input to the repeater station 40A, based on the monitor signal input from the monitoring circuit.

The repeater circuit 402 superposes a monitor signal input from the estimation computation unit 404 onto monitor light of the optical transmission system 2 and sends out the resulting light to the optical transmission channel 30. The optical receiver 20 receiving the monitor light can acquire polarization fluctuation speed from the monitor light received from the repeater station 40.

Each of the repeater stations 40 and 40A described above may estimate the polarization fluctuation speed of a polarization-multiplexed optical signal by using a procedure similar to the procedure being described in the second to fourth example embodiments and including the estimation computation unit 260 or 261. Further, the repeater station 40 or the optical receiver 20 receiving monitor light on which polarization fluctuation speed is superposed may perform estimation of an abnormal state of the transmission channel by using the procedure described in the fifth example embodiment.

Second Modified Example of Seventh Example Embodiment

Figure 18:
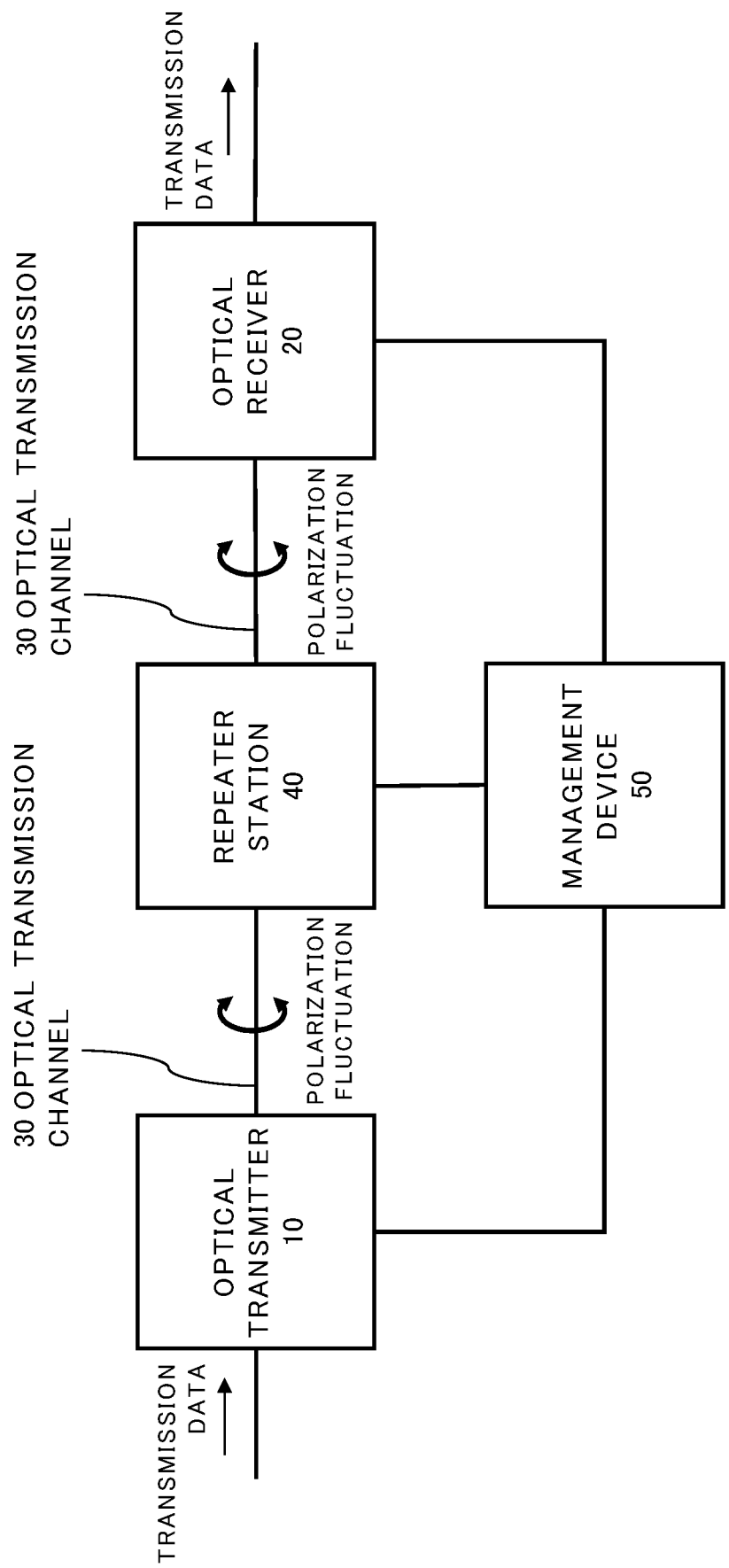
FIG. 18 is a block diagram illustrating a configuration example of an optical transmission system 3 according to a modified example of the seventh example embodiment.

FIG. 18 is a block diagram illustrating a configuration example of an optical transmission system 3 being a modified example of the seventh example embodiment of the present invention. The optical transmission system 3 includes an optical transmitter 10, an optical receiver 20, an optical transmission channel 30, a repeater station 40, and a management device 50. The management device 50 is a communication device or a server directly or indirectly connected to the optical transmitter 10, the optical receiver 20, or the repeater station 40. The management device 50 has a function of managing the optical transmission system 3 and the function of the estimation computation unit 260 or 261.

In the optical transmission system 3, the repeater station 40 transmits a monitor signal output by a monitoring circuit 403 to the management device 50. The management device 50 or the repeater station 40 may control a repeater circuit 402 in such a way that a signal output by the monitoring circuit 403 is transmitted by monitor light of the optical transmission system 3. In this case, a monitor signal output by the monitoring circuit 403 is sent to the management device 50 through the optical transmitter 10 or the optical receiver 20.

The management device 50 can estimate an amount of polarization fluctuation in a specific repeater section by collecting a monitor signal output by the monitoring circuit 403 in each of a plurality of repeater stations 40. When the optical transmission system 3 includes the repeater station 40A, the management device 50 receives an estimation result of an amount of polarization fluctuation from the repeater station 40A. Then, the management device 50 can estimate a cause of abnormality in a repeater section in the optical transmission system 3, based on estimation results of amounts of polarization fluctuation received from one or a plurality of repeater stations 40 or 40A.

Eighth Example Embodiment

Figure 19:
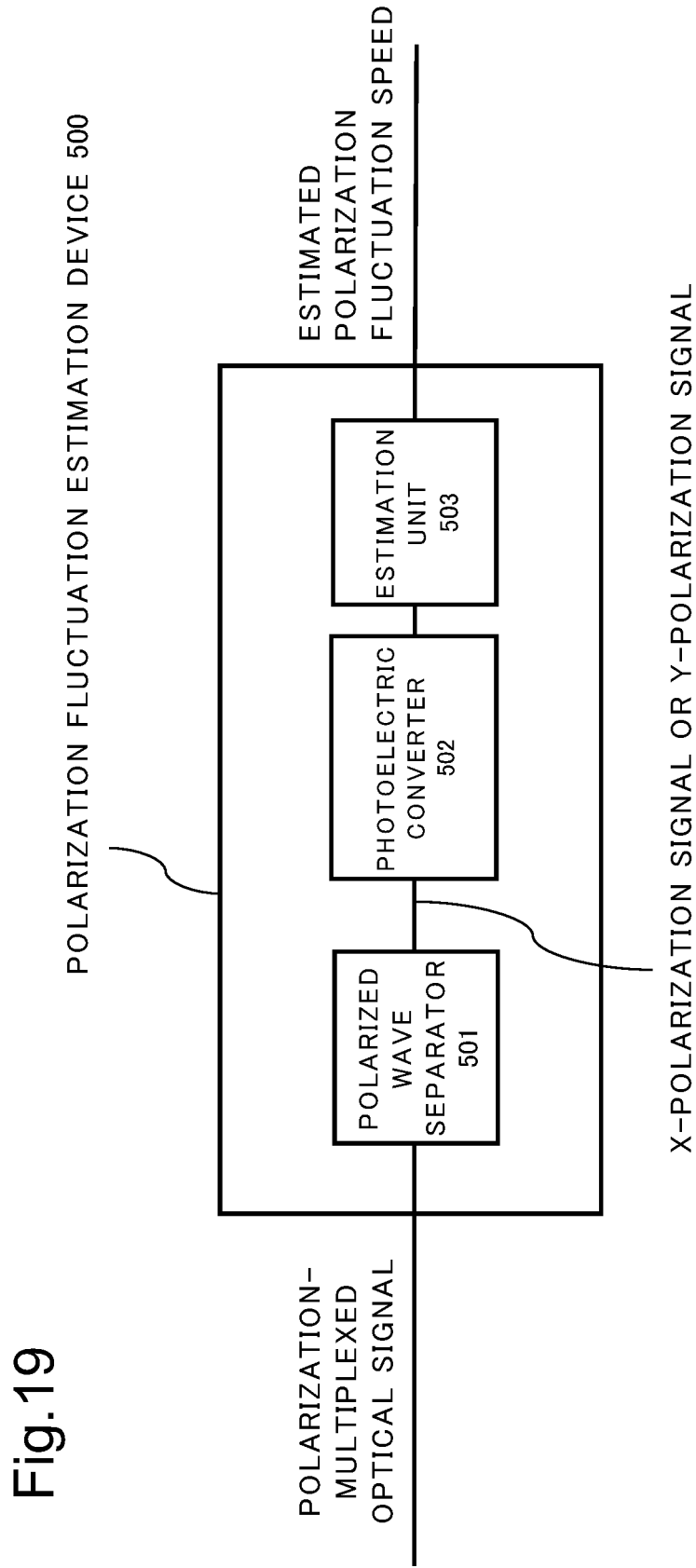
FIG. 19 is a block diagram illustrating a configuration example of a polarization fluctuation estimation device 500 according to an eighth example embodiment.

FIG. 19 is a block diagram illustrating a configuration example of a polarization fluctuation estimation device 500 according to an eighth example embodiment. The polarization fluctuation estimation device 500 includes a polarized wave separator 501, a photoelectric converter 502, and an estimation unit 503. The polarized wave separator 501 generates a single-polarization optical signal from an input polarization-multiplexed optical signal. The photoelectric converter 502 converts the optical signal generated by the polarized wave separator 501 into an electric signal. Accordingly, an electric signal related to the amplitude of an optical signal on a polarized wave output from the polarized wave separator 501 is input to the estimation unit 503. The estimation unit 503 estimates the polarization fluctuation speed of the polarization-multiplexed optical signal, based on the electric signal. The polarized wave separator 501 is also referred to as a polarization de-multiplexing means. A polarizing plate or a PBS may be used as the polarized wave separator 501 in the polarization estimation device 500. The photoelectric converter 502 is also referred to as a photoelectric conversion means. The estimation unit 503 is also referred to as an estimation means.

Figure 20:
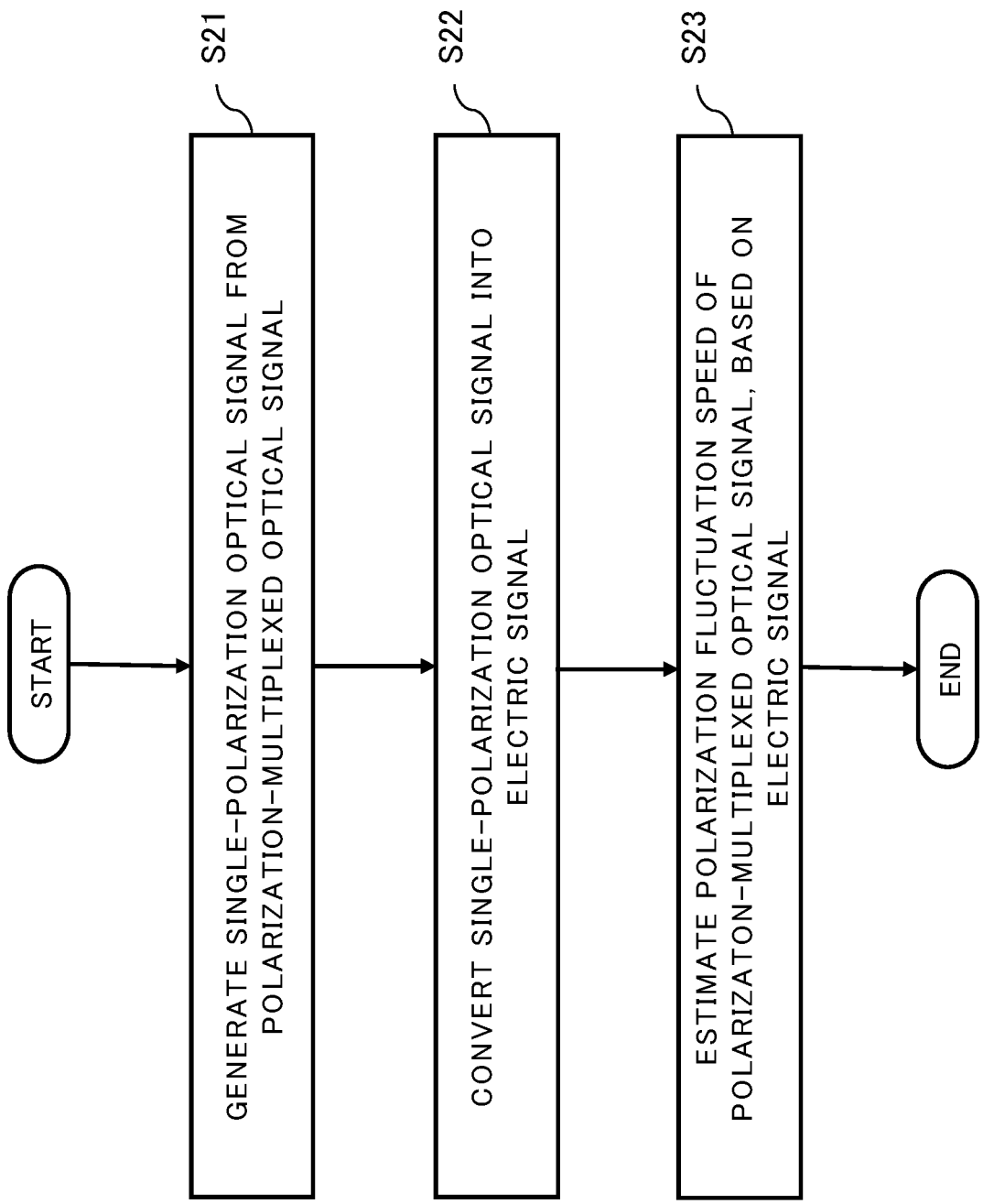
FIG. 20 is a flowchart illustrating an operation example of a polarization fluctuation estimation device 500.

An operation procedure for the polarization fluctuation estimation device 500 may also be described as a flowchart in FIG. 20.

Specifically, the polarized wave separator 501 generates a single-polarization optical signal from a polarization-multiplexed optical signal (Step S21 in FIG. 20). The photoelectric converter 502 converts the single-polarization optical signal into an electric signal (Step S22). The estimation unit 503 estimates the polarization fluctuation speed of the polarization-multiplexed optical signal, based on the electric signal (Step S23).

The polarization fluctuation estimation device 500 with such a configuration can estimate polarization fluctuation speed with a high degree of precision, based on a monitor signal. The reason is that the intensity of an optical signal separated into an X-polarization wave and a Y-polarization wave by the polarized wave separator 501 changes based on polarization fluctuation of the polarization-multiplexed optical signal, and therefore polarization fluctuation speed can be estimated from intensity fluctuation of the separated optical signal. Further, response speed of the photoelectric converter 502 is higher than common polarization fluctuation speed of a polarization-multiplexed optical signal in an optical transmission system and therefore does not affect estimation of the polarization fluctuation speed based on intensity fluctuation of the optical signal.

The functions and the procedures described in each of the aforementioned example embodiments may be provided by executing a program by a CPU or a DSP included in the estimation computation unit 260, 261, or 404 or the estimation unit 504. The program is recorded on a tangible and non-transitory recording medium. A semiconductor memory or a fixed magnetic disk device is used as the recording medium but the recording medium is not limited thereto. The CPU may be included in another location in the polarization fluctuation estimation unit according to each example embodiment.

The whole or part of the example embodiments disclosed above may also be described as, but not limited to, the following Supplementary Notes.

Supplementary Note 1

A polarization fluctuation estimation device including:
 a polarization de-multiplexing means for generating a single-polarization optical signal from an input polarization-multiplexed optical signal;
 a photoelectric conversion means for converting the generated optical signal into an electric signal; and
 an estimation means for performing estimation of polarization fluctuation speed of the polarization-multiplexed optical signal, based on the electric signal.

Supplementary Note 2

The polarization fluctuation estimation device according to Supplementary Note 1, further including
 an analog-to-digital conversion means for converting an analog signal input to the estimation means into a digital signal.

Supplementary Note 3

The polarization fluctuation estimation device according to Supplementary Note 1 or 2, further including
 an optical mixing means for outputting a beat light signal between the optical signal generated by the polarization de-multiplexing means and local light, wherein
 the photoelectric conversion means converts the beat light signal into the electric signal.

Supplementary Note 4

The polarization fluctuation estimation device according to any one of Supplementary Notes 1 to 3, further including
 an amplifier means for amplifying the electric signal, wherein
 the estimation means performs the estimation, based on amplitude of the amplified electric signal.

Supplementary Note 5

The polarization fluctuation estimation device according to Supplementary Note 4, wherein
 gain of the amplifier means is controlled in such a way that amplitude of the amplified electric signal is constant, and the estimation means performs the estimation, based on the gain.

Supplementary Note 6

The polarization fluctuation estimation device according to Supplementary Note 4 or 5, wherein
 the estimation means performs the estimation, based on a frequency spectrum based on amplitude of the electric signal.

Supplementary Note 7

The polarization fluctuation estimation device according to any one of Supplementary Notes 1 to 6, wherein
 the estimation means performs the estimation by applying the electric signal related to the polarization-multiplexed optical signal to a model generated by machine learning of the electric signal related to known polarization fluctuation speed.

Supplementary Note 8

The polarization fluctuation estimation device according to any one of Supplementary Notes 1 to 7, wherein
the estimation means determines normality of an optical transmission channel through which the polarization-multiplexed optical signal propagates, based on a result of the estimation.

Supplementary Note 9

The polarization fluctuation estimation device according to any one of Supplementary Notes 1 to 8, wherein
the estimation means estimates abnormality of the optical transmission channel by applying the electric signal related to the polarization-multiplexed optical signal to a model generated by machine learning of the electric signals related to a normal state and an abnormal state of a known optical transmission channel.

Supplementary Note 10

An optical transmission system including:
a repeater means including a polarization de-multiplexing means for generating a single-polarization optical signal from an input polarization-multiplexed optical signal, a photoelectric conversion means for converting the generated optical signal into an electric signal, and an analog-to-digital conversion means for converting the electric signal into a digital signal; and
a communication means including an estimation means for performing estimation of polarization fluctuation speed of the polarization-multiplexed optical signal, based on an electric signal output from the analog-to-digital conversion means, wherein
the repeater means and the communication means are communicably connected to each other.

Supplementary Note 11

The optical transmission system according to Supplementary Note 10, wherein
the communication means is an optical transmitter being a source of the polarization-multiplexed optical signal.

Supplementary Note 12

The optical transmission system according to Supplementary Note 10, wherein
the communication means is an optical receiver being a destination of the polarization-multiplexed optical signal.

Supplementary Note 13

The optical transmission system according to Supplementary Note 10, wherein
the communication means is a management device for the optical transmission system.

Supplementary Note 14

A management device including
an estimation means for receiving an electric signal generated based on amplitude of a single-polarization optical signal generated from a polarization-multiplexed optical signal and performing estimation of polarization fluctuation speed of the polarization-multiplexed optical signal, based on the electric signal.

Supplementary Note 15

The management device according to Supplementary Note 14, wherein
abnormality of a transmission channel of the polarization-multiplexed optical signal is estimated based on the electric signals respectively notified from a plurality of repeater means.

Supplementary Note 16

A polarization fluctuation estimation method including:
generating a single-polarization optical signal from an input polarization-multiplexed optical signal;
converting the single-polarization optical signal into an electric signal; and
performing estimation of polarization fluctuation speed of the polarization-multiplexed optical signal, based on the electric signal.

Supplementary Note 17

The polarization fluctuation estimation method according to Supplementary Note 16, further including
a procedure for converting the electric signal into a digital signal.

Supplementary Note 18

The polarization fluctuation estimation method according to Supplementary Note 16 or 17, further including
converting a beat light signal between the single-polarization optical signal and local light into the electric signal.

Supplementary Note 19

The polarization fluctuation estimation method according to any one of Supplementary Notes 16 to 18, further including:
amplifying the electric signal; and
performing the estimation, based on amplitude of the amplified electric signal.

Supplementary Note 20

The polarization fluctuation estimation method according to Supplementary Note 19, further including:
controlling gain when the electric signal is amplified in such a way that amplitude of the amplified electric signal is constant; and
performing the estimation, based on the gain.

Supplementary Note 21

The polarization fluctuation estimation method according to Supplementary Note 19 or 20, further including
performing the estimation, based on a frequency spectrum based on amplitude of the electric signal.

Supplementary Note 22

The polarization fluctuation estimation method according to any one of Supplementary Notes 16 to 21, further including
performing the estimation by applying the electric signal related to the polarization-multiplexed optical signal to a model generated by machine learning of the electric signal related to known polarization fluctuation speed.

Supplementary Note 23

The polarization fluctuation estimation method according to any one of Supplementary Notes 16 to 22, further including
determining normality of an optical transmission channel through which the polarization-multiplexed optical signal propagates, based on a result of the estimation.

Supplementary Note 24

The polarization fluctuation estimation method according to any one of Supplementary Notes 16 to 23, further including
estimating abnormality of the optical transmission channel by applying the electric signal related to the polarization-multiplexed optical signal to a model generated by machine learning of the electric signals related to a normal state and an abnormal state of a known optical transmission channel.

Supplementary Note 25

An optical transmission method including:
generating a single-polarization optical signal from an input polarization-multiplexed optical signal;

converting the single-polarization optical signal into an electric signal;
converting the electric signal into a digital signal; and
performing estimation of polarization fluctuation speed of the polarization-multiplexed optical signal, based on the digital signal.

Supplementary Note 26

The optical transmission method according to Supplementary Note 25, further including
performing the estimation by an optical transmitter being a source of the polarization-multiplexed optical signal.

Supplementary Note 27

The optical transmission method according to Supplementary Note 25, further including
performing the estimation by an optical receiver being a destination of the polarization-multiplexed optical signal.

Supplementary Note 28

The optical transmission method according to Supplementary Note 25, further including
performing the estimation by a management device for an optical transmission system.

Supplementary Note 29

A management device control method including:
receiving an electric signal generated based on amplitude of a single-polarization optical signal generated from a polarization-multiplexed optical signal; and
performing estimation of polarization fluctuation speed of the polarization-multiplexed optical signal, based on the electric signal.

Supplementary Note 30

The management device control method according to Supplementary Note 29, further including
estimating abnormality of a transmission channel of the polarization-multiplexed optical signal, based on the electric signals respectively notified from a plurality of repeater means.

Supplementary Note 31

A recording medium having a program for a polarization fluctuation estimation device recorded thereon, the program causing a computer in the polarization fluctuation estimation device to execute
a procedure for performing estimation of polarization fluctuation speed of an input polarization-multiplexed optical signal, based on an electric signal converted from a single-polarization optical signal generated from the polarization-multiplexed optical signal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. For example, each example embodiment is also applicable to a terrestrial optical transmission system without being limited to a submarine cable system.

Further, the configurations described in the example embodiments are not necessarily exclusive to each other. The advantageous effects of the present invention may be provided by configurations acquired by combining the whole or part of the aforementioned example embodiments.

This application is based upon and claims the benefit of priority from Japanese patent application No. 2020-069132, filed on Apr. 7, 2020, the disclosure of which is incorporated herein in its entirety by reference.

REFERENCE SIGNS LIST 1-3 Optical transmission system
10 Optical transmitter
20, 21 Optical receiver
30 Optical transmission channel
40, 40A Repeater station
50 Management device
200-203 Polarization fluctuation estimation unit
210 Local oscillator
220 Optical mixer
221 PBS
222 90-degree optical hybrid circuit
230 Photoelectric converter
240 Amplifier
241 Amplifier circuit
242 Variable gain amplifier circuit
243 Gain control circuit
250 Monitor signal acquisition unit
260, 261 Estimation computation unit
280 Demodulation unit
281 MIMO equalizer
290 Selection unit
400 Repeater device
401 Coupler
402 Repeater circuit
403, 403A, 403B, 403C Monitoring circuit
404 Estimation computation unit
411 PBS
412 Photoelectric converter
413 Amplifier
414 Photoelectric converter
415 Amplifier
500 Polarization fluctuation estimation device
501 Polarized wave separator
502 Photoelectric converter
503 Estimation unit
800 Polarization de-multiplexing/signal conversion unit
810 Optical front end

What is claimed is:

1. A polarization fluctuation estimation device comprising:
a polarization de-multiplexer configured to generate a single-polarization optical signal from an input polarization-multiplexed optical signal;
a photoelectric converter configured to convert the generated optical signal into an electric signal; and
at least one processor configured to execute an estimator configured to perform estimation of polarization fluctuation speed of the polarization-multiplexed optical signal, based on amplitude of the electric signal.

2. The polarization fluctuation estimation device according to claim 1, further comprising:
an analog-to-digital configured to convert an analog signal input to the estimator into a digital signal.

3. The polarization fluctuation estimation device according to claim 1, further comprising:
an optical mixer configured to output a beat light signal between the optical signal generated by the polarization de-multiplexer and local light,
wherein the photoelectric converter is configured to convert the beat light signal into the electric signal.

4. The polarization fluctuation estimation device according to claim 1, further comprising:
an amplifier configured to amplify the electric signal,
wherein the estimator performs the estimation, based on amplitude of the amplified electric signal.

5. The polarization fluctuation estimation device according to claim 4, wherein gain of the amplifier is controlled in such a way that amplitude of the amplified electric signal is constant, and
wherein the estimator performs the estimation, based on the gain.

6. The polarization fluctuation estimation device according to claim 4, wherein the estimator performs the estimation, based on a frequency spectrum based on amplitude of the electric signal.

7. The polarization fluctuation estimation device according to claim 1, wherein the estimator performs the estimation by applying the electric signal related to the polarization-multiplexed optical signal to a model generated using machine learning of the electric signal related to known polarization fluctuation speed.

8. The polarization fluctuation estimation device according to claim 1, wherein the estimator determines normality of an optical transmission channel through which the polarization-multiplexed optical signal propagates, based on a result of the estimation.

9. The polarization fluctuation estimation device according to claim 1, wherein the estimator estimates abnormality of the optical transmission channel by applying the electric signal related to the polarization-multiplexed optical signal to a model generated using machine learning of the electric signals related to a normal state and an abnormal state of a known optical transmission channel.

10. A polarization fluctuation estimation method comprising:
generating a single-polarization optical signal from an input polarization-multiplexed optical signal;
converting the single-polarization optical signal into an electric signal; and
performing estimation of polarization fluctuation speed of the polarization-multiplexed optical signal, based on amplitude of the electric signal.

11. The polarization fluctuation estimation method according to claim 10, further comprising:
a procedure for converting the electric signal into a digital signal.

12. The polarization fluctuation estimation method according to claim 10, further comprising:
converting a beat light signal between the single-polarization optical signal and local light into the electric signal.

13. The polarization fluctuation estimation method according to claim 10, further comprising:
amplifying the electric signal; and
performing the estimation, based on amplitude of the amplified electric signal.

14. The polarization fluctuation estimation method according to claim 13, further comprising:
controlling gain when the electric signal is amplified in such a way that amplitude of the amplified electric signal is constant; and
performing the estimation, based on the gain.

15. The polarization fluctuation estimation method according to claim 13, further comprising:
performing the estimation, based on a frequency spectrum based on amplitude of the electric signal.

16. The polarization fluctuation estimation method according to claim 10, further comprising:
performing the estimation by applying the electric signal related to the polarization-multiplexed optical signal to a model generated using machine learning of the electric signal related to known polarization fluctuation speed.

17. The polarization fluctuation estimation method according to claim 10, further comprising:
determining normality of an optical transmission channel through which the polarization-multiplexed optical signal propagates, based on a result of the estimation.

18. The polarization fluctuation estimation method according to claim 10, further comprising:
estimating abnormality of the optical transmission channel by applying the electric signal related to the polarization-multiplexed optical signal to a model generated using machine learning of the electric signals related to a normal state and an abnormal state of a known optical transmission channel.

* * * * *